(12) United States Patent
Conti

(10) Patent No.: US 11,623,703 B2
(45) Date of Patent: Apr. 11, 2023

(54) PROPULSION IN GRANULAR MEDIA

(71) Applicant: CROVER LTD, Edinburgh (GB)

(72) Inventor: Lorenzo Conti, Edinburgh (GB)

(73) Assignee: CROVER LTD, Edinburgh (GB)

(*) Notice: Subject to any disclaimer, the term of this patent is extended or adjusted under 35 U.S.C. 154(b) by 388 days.

(21) Appl. No.: 16/759,541

(22) PCT Filed: Oct. 31, 2018

(86) PCT No.: PCT/GB2018/053157
§ 371 (c)(1),
(2) Date: Apr. 27, 2020

(87) PCT Pub. No.: WO2019/086870
PCT Pub. Date: May 9, 2019

(65) Prior Publication Data
US 2020/0283081 A1   Sep. 10, 2020

(30) Foreign Application Priority Data

Oct. 31, 2017   (GB) .................................... 1717993

(51) Int. Cl.
*B62D 57/04*   (2006.01)
(52) U.S. Cl.
CPC .................. *B62D 57/04* (2013.01)
(58) Field of Classification Search
CPC .................................................. B62D 57/04
See application file for complete search history.

(56) References Cited

U.S. PATENT DOCUMENTS

| | | | | |
|---|---|---|---|---|
| 2,909,145 A * | 10/1959 | De Hertelendy | ...... | B62D 57/04 180/21 |
| 3,111,928 A * | 11/1963 | Schmidt | ................... | B63H 1/36 244/62 |
| 3,237,885 A * | 3/1966 | Mohar | ................... | B62D 57/04 244/50 |
| 6,415,722 B1 * | 7/2002 | Reis | ....................... | B62D 57/04 104/138.2 |
| 2017/0313369 A1 * | 11/2017 | Li | ........................... | B62D 57/04 |
| 2019/0092406 A1 * | 3/2019 | Kossett | ................. | B62D 57/02 |

FOREIGN PATENT DOCUMENTS

| | | |
|---|---|---|
| CN | 2649273 Y | 10/2004 |
| CN | 201524412 U | 7/2010 |
| CN | 105223629 B | 8/2017 |

(Continued)

OTHER PUBLICATIONS

Seth, Radhika, "A Worm That Get's It All," Yanko Design, 2017, [http://www.yankodesign.com/2014/10/03/a-worm-that-get%E2%80%99s-it-all/].

(Continued)

*Primary Examiner* — Jacob B Meyer
(74) *Attorney, Agent, or Firm* — Oliff PLC

(57) ABSTRACT

A method of propelling an object through a granular medium including granular material, wherein the object is provided with one or more rotatable portions, includes: providing the object submerged in the granular medium; and rotating at least one of the one or more rotatable portions about an axis of rotation to thereby move granular material adjacent the one or more rotatable portions and propel the object through the granular medium.

20 Claims, 27 Drawing Sheets

(56) References Cited

FOREIGN PATENT DOCUMENTS

| CN | 107187568 | A |   | 9/2017 |             |
|----|-----------|---|---|--------|-------------|
| CN | 112829850 | A | * | 5/2021 | B62D 57/04  |
| DE | 2946873   | A1|   | 7/1981 |             |
| EP | 1193168   | A2| * | 4/2002 | B62D 57/02  |
| GB | 2464458   | A |   | 4/2010 |             |
| KR | 20140111162| A|   | 9/2014 |             |
| RU | 66241     | U1|   | 9/2007 |             |
| SU | 291006    |   |   | 1/1971 |             |
| WO | WO-2008076194 | A2 | * | 6/2008 | B62D 55/065 |
| WO | 2016/035066 | A1 |   | 3/2016 |             |
| WO | WO-2019086870 | A1 | * | 5/2019 | B62D 57/02 |
| WO | WO-2022053810 | A1 | * | 3/2022 | B60B 19/00 |

OTHER PUBLICATIONS

Russel, R. Andrew, "An agile burrowing robot for underground chemical source location," Proceedings of Australasian Conference on Robotics and Automation, Dec. 7-9, 2011, Monash University, Melbourne, Australia.

Russel, R. Andrew, "CRABOT: A Biomimetic Burrowing Robot Designed for Underground Chemical Source Location," Advanced Robotics, 2011, vol. 25, pp. 119-134.

Ding et al., "Drag Induced Lift in Granular Media," Physical Review Letters, 2011, vol. 106, No. 2, 028001.

Coxworth, Ben, "Lizard-inspired robot can swim through granular material," New Atlas, Robotics, May 10, 2011, [http://newatlas.com/burrowing-robot-inspired-by-sandfish-lizard/18600/].

Maladen et al., "Undulatory Swimming in Sand: Subsurface Locomotion of the Sandfish Lizard," Science, Jul. 17, 2009, vol. 325, pp. 314-318.

Maladen et al., "Biophysically Inspired Development of a Sand-Swimming Robot," Robotics: Science & Systems (RSS), 2010.

Maladen et al., "Mechanical models of sandfish locomotion reveal principles of high performance subsurface sand-swimming," Journal of the Royal Society Interface, 2011, vol. 8, No. 62, pp. 1332-1345.

Maladen et al., "Granular lift forces preduct vertical motion of a sand-swimming robot," IEEE International Conference on Robotics and Automation (ICRA), 2011, pp. 1398-1403.

Guillard et al., "Lift forces in granular media," Physics of Fluids, 2014, vol. 26, 043301.

"Afeka College of Engineering Israel Unmanned Autonomous Burrowing Vehicle Testing," Nov. 4, 2016, [https://www.youtube.com/watch?v=mdFiaTLmPQE].

"Design Of A Bimodal Self-Burying Robot," Jun. 27, 2013, [https://www.youtube.com/watch?v=Yuw2jW5QwVQ].

Mar. 1, 2019 International Search Report issued in International Patent Application No. PCT/GB2018/053157.

Mar. 1, 2019 Written Opinion of the International Searching Authority issued in International Patent Application No. PCT/GB2018/053157.

Sep. 17, 2019 Written Opinion of the International Preliminary Examining Authority issued in International Patent Application No. PCT/GB2018/053157.

\* cited by examiner

PROPULSION IN GRANULAR MEDIA

FIELD OF THE INVENTION

The invention relates to methods of propelling objects through granular media, propulsion means for propelling objects through granular media and vehicles for transportation through granular media.

BACKGROUND TO THE INVENTION

Few devices have been designed which are capable of transportation through granular media such as sand or cereal grain. This is, in part, because of the practical difficulties in observing what happens below the surface of a granular medium necessary for building and testing such devices, as well as the large stresses required to overcome dense grain packings and the general lack of knowledge of how grains flow in complex systems. Nevertheless, devices for transportation through granular media could find many practical applications, including in: locating and retrieving underground or under-seabed objects; detecting underground chemical leaks; removing vehicles (such as cars) trapped in sand; the scientific exploration of underground environments, particularly in planetary exploration; and monitoring and mixing cereal grains and powders stored in silos.

The few currently existing devices typically achieve propulsion through granular media by way of translational displacement of grains on application of a normal force (for example, through the flapping of vanes) or by way of the lift force generated when an object is dragged horizontally through a granular medium. Such devices require the application of substantial forces in order to achieve propulsion, which leads to large stresses being exerted on the device bodies and effectively restricts operation to shallow or only semi-submerged states, since the forces required to translate grains typically increase with depth in the granular medium. The devices are generally very inefficient and substantial vertical motion of such devices is also difficult to achieve.

Accordingly, there is a need for devices for transportation through granular media which result in lower device body stresses, which are more efficient, which are operable at greater depths and/or which can achieve substantially vertical device motion.

SUMMARY OF THE INVENTION

An aspect of the invention provides a method of propelling an object through a granular medium comprising granular material. The object is typically provided with one or more rotatable portions. The method typically comprises providing the object submerged in the granular medium (i.e. submerged in granular material) and rotating at least one of the (e.g. each of the) one or more rotatable portions about an (i.e. respective) axis of rotation. Rotation of the at least one of the (e.g. each of the) one or more rotatable portions about the (i.e. respective) axis of rotation typically causes movement of granular material adjacent the one or more rotatable portions and (i.e. consequently) propulsion of the object through the granular medium.

A further aspect of the invention provides propulsion means (e.g. a propulsion unit) for propelling an object through the granular medium comprising granular material. The propulsion means (e.g. propulsion unit) is typically couplable or coupled to the object. The propulsion means (e.g. propulsion unit) typically comprises one or more rotatable portions. The one or more rotatable portions are typically rotatable about an (i.e. respective) axis of rotation. The one or more rotatable portions are typically configured (e.g. shaped and arranged) such that rotation of at least one of the (e.g. typically each of the) one or more rotatable portions about the (i.e. respective) axis of rotation, when the propulsion means (e.g. propulsion unit) is coupled to the object and the object and the propulsion means (e.g. propulsion unit) are submerged in the granular medium (i.e. submerged in granular material), typically causes movement of granular material adjacent the one or more rotatable portions and (i.e. consequently) propulsion of the object through the granular medium.

It will be understood that a granular material typically comprises a plurality of grains (i.e. particles). The grains (i.e. particles) are typically solid. The grains (i.e. particles) typically have a (e.g. mean (for example, volume-weighted mean or mass-weighted mean) or median (for example, volume-weighted median or mass-weighted median)) diameter of between 0.1 µm and 10 cm (for example, grains making up fine powders can have (e.g. mean (for example, volume-weighted mean or mass-weighted mean) or median (for example, volume-weighted median or mass-weighted median)) diameters of as low as 0.1 µm, grains making up coarse powders typically have (e.g. mean (for example, volume-weighted mean or mass-weighted mean) or median (for example, volume-weighted median or mass-weighted median)) diameters of around 0.05 mm, cereal grains can have (e.g. mean (for example, volume-weighted mean or mass-weighted mean) or median (for example, volume-weighted median or mass-weighted median)) diameters of up to around 5 mm and pebbles can have (e.g. mean (for example, volume-weighted mean or mass-weighted mean) or median (for example, volume-weighted median or mass-weighted median)) diameters of the order of 1 cm to 10 cm). The grains are typically packed together to form the granular medium, i.e. the granular medium is typically a conglomeration of said grains (i.e. particles). The granular medium may comprise (e.g. consist of), for example, sand, soil, stone or rock (e.g. pebbles), beans (such as coffee beans or cocoa beans), cereal grain (such as maize or wheat) or powder (such as cocoa powder). The granular medium may be dry. A gaseous phase (e.g. air) may be provided between the grains. Alternatively, the granular medium may be wet (i.e. liquid may fill some or all interstitial spaces between adjacent grains (i.e. particles) in the granular medium).

The inventor has found that rotation of the one or more rotatable portions and consequential movement of granular material adjacent the rotatable portions causes a force to be exerted on the object which drives movement of the object through the granular medium. The method and propulsion means (e.g. propulsion unit) provide particularly simple and efficient means for driving movement of an object through a granular medium.

Without wishing to be bound by theory, the inventor proposes that rotation of the rotatable portions disturbs grains located around the object and/or the rotatable portions (i.e. the propulsion means (e.g. propulsion units)), resulting in (i.e. local) liquefaction of the granular medium. In this context, it will be understood that the term "liquefaction" does not refer to melting of the grains to form a liquid or dissolution of the grains into a solvent. Instead, by "liquefaction" we refer to formation of a liquid-like (i.e. fluidised) phase in the granular medium as compared to the densely-packed static or quasi-static phase present when there is no rotation of the rotatable portions. In the case of a dry granular medium (i.e. in which either a gaseous phase (e.g. air) or no phase (e.g. vacuum) is provided between the grains), grains in the liquid-like phase behave according to either an 'inertial regime' (as is well known in granular physics) in which the grains are unable to form long force chains and in which stresses are mainly transferred by dynamic collisions between grains or an 'intermediate regime' (which is also well known in granular physics, and which typically occurs at high shear rates) intermediate the inertial and quasi-static regimes, or a combination of both said intermediate and inertial regimes. In the case of a wet granular medium (i.e. in which an interstitial liquid (e.g. water) is provided between the grains), in the liquid-like phase, stresses are not transferred predominantly through granular force chains but instead through the interstitial liquid. Liquefaction of the granular medium surrounding the object and/or rotatable portions facilitates movement of the object through the granular medium, since lower forces must be overcome on movement.

The method may be a method of propelling an object (i.e. at least partially) in a vertical direction through a granular medium. The propulsion means (e.g. propulsion unit) may be a propulsion means (e.g. propulsion unit) for propelling an object (i.e. at least partially) in a vertical direction through a granular medium. For example, the method may be a method of propelling an object upwards through a granular medium (i.e. against gravity). Additionally or alternatively, the method may be a method of propelling an object downwards through a granular medium (i.e. with gravity). The propulsion means (e.g. propulsion unit) may be a propulsion means (e.g. propulsion unit) for propelling an object upwards through a granular medium (i.e. against gravity). The propulsion means (e.g. propulsion unit) may be a propulsion means (e.g. propulsion unit) for propelling an object downwards through a granular medium (i.e. with gravity). Vertical motion of the object on rotation of the or each rotatable portion is counterintuitive as such vertical motion would not typically arise were the object submerged in, for example, a conventional liquid (i.e. a Newtonian liquid) or solid. Similar behaviours are also not typically observed in unconventional liquids such as non-Newtonian liquids.

Without wishing to be bound by theory, the inventor proposes that movement of the object in the vertical direction (whether upwards or downwards) is driven at least in part by gravity (which acts as a vertical compacting force on the granular medium). For example, it may be that, when rotation of the rotatable portions disturbs grains located around the object and/or the rotatable portions (i.e. the propulsion means (e.g. propulsion units)), some of those grains move downwards under the influence of gravity in combination with the flow of material generated by rotation of the rotatable portion. A net (i.e. vertical) movement of grains from above the object to below the object leads to a corresponding upwards movement of the object. In particular, grains moving from above the object to below the object tend to jam underneath the object, transfer momentum to the object, and exert an upwards force on the object. However, in some circumstances (dependent on the weight and/or density of the object and rotatable portions), the object may sink through the liquid-like granular medium. Accordingly, vertical movement of the object within the liquid-like phase of the granular medium is in some ways analogous to the buoyancy of an object in a conventional liquid: in general, when the relative density of the object as compared to the liquid-like granular medium is low, a net upwards force is exerted on the object, but when the relative density of the object as compared to the liquid-like granular medium is high, a new downwards force is exerted on the object. Unlike in conventional buoyancy, however, the transition between upwards and downwards movement of the object typically occurs at a ratio between the density of the object and the density of the granular medium which is greater than 1. The method and propulsion means (e.g. propulsion unit) provide particular simple and efficient means for driving movement of an object upwards and/or downwards through a granular medium.

Additionally or alternatively, the method may be a method of propelling an object (i.e. at least partially) in a horizontal direction through a granular medium. The propulsion means (e.g. propulsion unit) may be a propulsion means (e.g. propulsion unit) for propelling an object in a horizontal direction through a granular medium. A (i.e. net) lateral (e.g. horizontal) movement of grains from one side of the object to another side of the object typically leads to a corresponding lateral (e.g. horizontal) movement of the object. This phenomenon typically only occurs when the axis of rotation is non-vertical (e.g. substantially horizontal). Counterintuitively, the lateral direction of motion of the object in the granular medium is typically opposite to the lateral direction of motion in which the object would move if it were placed on a solid surface and the or each rotatable portion were rotated in the same rotational direction.

Without wishing to be bound by theory, the inventor proposes that, due to the asymmetry introduced by the action of gravity and the rotation of the or each rotatable portion, grains in the liquid-like granular medium tend to flow towards and jam underneath each said rotatable portion on the side of said rotatable portion which is travelling downwards during its rotation cycle. There is consequently typically increased compaction of grains on the said downwards travelling side of the rotatable portion and reduced compaction on the opposing upwards travelling side of the rotatable portion (i.e. there is a lateral density differential in the granular medium surrounding the object) such that there is a net lateral (e.g. horizontal) force exerted on the object which causes lateral (e.g. horizontal) movement of said object.

Accordingly, the force exerted on the object typically has a vertical component and may also have a horizontal component (i.e. dependent on the orientation of the or each rotatable portion). The method may therefore be a method of propelling an object both upwards and/or downwards and laterally through a granular medium. The propulsion means (e.g. propulsion unit) may be a propulsion means (e.g. propulsion unit) for propelling an object both upwards and/or downwards and laterally through a granular medium.

It will be understood that, throughout this specification and the appended claims, the term 'horizontal' is defined with reference to a horizontal direction perpendicular to the direction in which the force due to gravity acts at a given location (i.e. perpendicular to the gradient of the local gravitational field). The term 'vertical' is similarly defined with reference to a vertical direction parallel to said direction in which the force due to gravity acts at a given location. The terms 'downwards' and 'upwards' are used with reference to this vertical direction: 'downwards' referring to a direction of motion having a component parallel to the direction in which the force due to gravity acts and 'upwards' referring to a direction of motion having a component antiparallel to the direction in which the force due to gravity acts. The terms 'lateral' and 'laterally' are used to refer to a direction of motion having a horizontal component.

The object is typically submerged (e.g. fully submerged) in the granular medium, that is to say that the majority (e.g.

all) of the object is covered by the granular medium, at least prior to propelling the object (e.g. upwards) through the granular medium. Accordingly, the method may comprise providing the object submerged (e.g. fully submerged) in the granular medium and rotating at least one of the (e.g. each of the) one or more rotatable portions about the (i.e. respective) axis of rotation to thereby propel the object (e.g. upwards) through the granular medium. The method is therefore suitable for use in the retrieval of objects buried fully in a granular medium such as sand.

The direction of motion of the object through the granular medium typically depends on the orientation of the axis of rotation of each of the one or more rotatable portions.

It may be that the axis of rotation of at least one (and typically each) of the one or more rotatable portions is (i.e. substantially) horizontal in use. An acute angle between the axis of rotation of the at least one (and typically each) of the one or more rotatable portions and the horizontal may be less than 45°, or more typically less than 30°, or more typically less than 15°, or more typically less than 5°, for example approximately 0°, in use. The method may comprise rotating at least one (and typically each) of the one or more rotatable portions about a (i.e. respective) (i.e. substantially) horizontal axis of rotation to thereby propel the object (e.g. upwards) through the granular medium.

The inventor has found that, when the axis of rotation is (i.e. substantially) horizontal, the force exerted on the object typically has a non-zero horizontal component and a non-zero vertical component such that the object is propelled both upwards and laterally (i.e. along a direction lying between the horizontal and vertical) through the granular medium. The horizontal component typically acts in a direction perpendicular to the axis of rotation.

It may be that the axis of rotation of at least one (and typically each) of the one or more rotatable portions is (i.e. substantially) vertical in use. An acute angle between the axis of rotation of the at least one (and typically each) of the one or more rotatable portions and the vertical may be less than 45°, or more typically less than 30°, or more typically less than 15°, or more typically less than 5°, for example approximately 0°, in use. The method may comprise rotating at least one (and typically each) of the one or more rotatable portions about a (i.e. respective) (i.e. substantially) vertical axis of rotation to thereby propel the object (e.g. upwards) through the granular medium.

The inventor has found that, when the axis of rotation is (i.e. substantially) vertical, the force exerted on the object typically has a negligible (e.g. zero) horizontal component and a non-zero vertical component such that the object is propelled (i.e. substantially) vertically upwards through the granular medium and any lateral movement of the object is negligible (i.e. the object is propelled predominantly (e.g. entirely) in the vertical direction).

The inventor has found that, when the axis of rotation is intermediate the horizontal and the vertical, the force exerted on the object typically has a non-zero horizontal component and a non-zero vertical component such that the object is propelled both upwards and laterally (i.e. along a direction lying between the horizontal and vertical) through the granular medium. The horizontal component typically acts in a direction perpendicular to the axis of rotation. The magnitude of the horizontal component typically decreases towards zero as the angle of inclination between the axis of rotation and the horizontal is increased.

The method may comprise propelling the object in a direction (i.e. substantially) perpendicular to the axis of rotation (e.g. when the axis of rotation is (i.e. substantially) horizontal). The method may comprise propelling the object in a direction (i.e. substantially) parallel to the axis of rotation (e.g. when the axis of rotation is (i.e. substantially) vertical). The method may comprise propelling the object in a direction inclined with respect to the axis of rotation (e.g. when the axis of rotation is intermediate horizontal and vertical orientations).

The object typically comprises a body. The one or more rotatable portions are typically coupled to the body. The one or more rotatable portions may be attached to the body. The one or more rotatable portions may be integrally formed with the body. The one or more rotatable portions may be formed by part of the body. The one or more rotatable portions may surround at least part of the body. The one or more rotatable portions may extend (e.g. completely) around at least part of (e.g. all of) the body. The one or more rotatable portions may comprise (e.g. form) an exterior surface of the body.

The one or more rotatable portions are typically (i.e. substantially) circular in cross-section.

The one or more rotatable portions may be (i.e. substantially) spherical. The one or more rotatable portions may be (i.e. substantially) ellipsoidal. The one or more rotatable portions may be (i.e. substantially) spheroidal.

The one or more rotatable portions may be elongate. The one or more rotatable portions may each extend along a respective longitudinal axis. Each of the one or more rotatable portions may be (i.e. substantially) circular in cross-section (i.e. perpendicular to the respective longitudinal axis) at at least one location along the longitudinal axis (i.e. along the length) of the said rotatable portion. Each of the one or more rotatable portions may be (i.e. substantially) circular in cross-section (i.e. perpendicular to the respective longitudinal axis) along at least a portion of the said rotatable portion. Each of the one or more rotatable portions may be (i.e. substantially) circular in cross-section (i.e. perpendicular to the respective longitudinal axis) along the majority of the length of the said rotatable portion. Each of the one or more rotatable portions may be (i.e. substantially) circular in cross-section (i.e. perpendicular to the respective longitudinal axis) along the entire length of the said rotatable portion.

The term "circular in cross-section" is not intended to imply that the cross-section of the said rotatable portion is perfectly circular. Indeed, an external surface of each rotatable portion may comprise one or more microscopic or macroscopic asperities, asymmetries or textures which deviate from a perfectly circular cross-section, but the cross-section still remains substantially circular, that is to say at least generally circular. For example, it may be that the cross-section is generally circular in shape and that all points on the external surface of the rotatable portion in the plane of the cross-section (i.e. points lying on the perimeter of the generally circular cross-section) are located no greater than a distance x away from the imaginary perimeter of a perfect circle enclosing the same area as the generally circular cross-section and centred on the centroid of the generally circular cross-section, wherein x is no greater than 20% of, or more typically no greater than 10%, or even more typically no greater than 5% of, the radius of said perfect circle. A (i.e. substantially) circular cross-section results in more efficient propulsion of the object through the granular medium as direct translation of grains (i.e. particles) is reduced, particularly in embodiments in which the one or more rotatable portions rotate about a (i.e. respective) major axis (e.g. the longitudinal axis of an elongate rotatable portion).

The cross-sectional shape and/or area of each rotatable portion (i.e. perpendicular to the respective longitudinal axis) may be constant along the length of the said rotatable portion. Alternatively, the cross-sectional shape and/or area of each rotatable portion (i.e. perpendicular to the respective longitudinal axis) may vary along the length of the said rotatable portion. However, the external shape of each rotatable portion is typically convex and does not typically comprise any (i.e. substantial) concave portions.

Typically, the external surface of each rotatable portion is not threaded and the rotatable portion is not screw-shaped or spiral in shape.

The external surface of one or more of (e.g. each of) the rotatable portions may be (i.e. substantially) smooth. The external surface of one or more of (e.g. each of) the rotatable portions may be (i.e. substantially) continuous. The external surface of one or more of (e.g. each of) the rotatable portions may comprise one or more recesses. The external surface of one or more of (e.g. each of) the rotatable portions may comprise one or more grooves. The external surface of one or more of (e.g. each of) the rotatable portions may comprise one or more dimples. The external surface of one or more of (e.g. each of) the rotatable portions may comprise one or more apertures. The external surface of one or more of (e.g. each of) the rotatable portions may comprise one or more holes.

The one or more rotatable portions may be (i.e. substantially) cylindrical.

The axis of rotation of each said rotatable portion and the longitudinal axis of the same said rotatable portion may be coincident (i.e. the longitudinal axis may be the axis of rotation). The method may comprise rotating at least one (and typically each) of the one or more rotatable portions about the respective longitudinal axis to thereby propel the object (e.g. upwards) through the granular medium. The axis of rotation may extend through the centre of mass of the respective rotatable portion.

It may be that the axis of rotation of each said rotatable portion and the longitudinal axis of said same rotatable portion are not coincident. It may be that the axis of rotation and the longitudinal axis are spaced apart from one another. It may be that the axis of rotation and the longitudinal axis intersect one another. It may be that the axis of rotation and the longitudinal axis are parallel. It may be that the axis of rotation does not extend through the centre of mass of the said rotatable portion.

The one or more rotatable portions are typically bladeless or finless, i.e. typically the one or more rotatable portions do not comprise blades or fins (e.g. extending laterally from a shaft). In particular, the force acting on the object which causes propulsion of the object through the granular medium is not typically generated (at least predominantly) by translational displacement of granular material by the movement of one or more blades or fins. Instead, the force is derived (at least predominantly) from (i.e. tangential) frictional interactions between the external surfaces of the one or more rotatable portions and the granular material.

The object may be provided with one or more reaction portions. The propulsion means (e.g. propulsion unit) may comprise one or more reaction portions. The one or more rotatable portions may be rotatable relative to the (i.e. corresponding) one or more reaction portions. The method may comprise rotating at least one of the (e.g. each of the) one or more rotatable portions relative to at least one of the (e.g. each of the) (i.e. respective) one or more reaction portions. The one or more reaction portions may remain (i.e. substantially) static (i.e. non-rotating) while the one or more rotatable portions rotate. The one or more reaction portions may rotate in an opposite sense (i.e. direction) from the one or more (i.e. respective) rotatable portions.

The propulsion means (e.g. the propulsion unit) may be seen to be a propeller in the sense of apparatus (e.g. a device) which drives or is capable of driving propulsion of an object through a granular medium. However, it will be understood that the term propeller is not used in the sense of an aeronautical propeller comprising one or more angled blades attached to and rotatable with a rotatable shaft.

The granular medium (e.g. the grains forming the granular medium) typically has a coefficient of friction equal to or greater than 0.25 (or more typically 3). The external surfaces of the one or more rotatable portions typically have a coefficient of friction equal to or greater than 0.25 (or more typically 0.3), otherwise friction between the rotatable portions and the surrounding granular medium is typically too low to generate motion of the object. The inventor has found that, as the friction coefficients of the granular medium and/or the external surfaces of the one or more rotatable portions increase, the direction of motion of the object becomes more vertical.

The one or more rotatable portions (e.g. the circular cross-section of the one or more rotatable portions) typically each have diameters greater than the (e.g. mean) diameter of grains (i.e. particles) forming the granular medium. The one or more rotatable portions (e.g. the circular cross-section of the one or more rotatable portions) typically each have diameters at least two times greater than the (e.g. mean) diameter of grains (i.e. particles) forming the granular medium. The one or more rotatable portions (e.g. the circular cross-section of the one or more rotatable portions) may each have diameters less than or equal to six times the (e.g. mean) diameter of grains (i.e. particles) forming the granular medium. The inventor has found that the horizontal component of the velocity of the object travelling through the granular medium on rotation of the one or more rotatable portions tends to increase as the diameter of each said one or more rotatable portions increases towards six times the (e.g. mean) diameter of the grains, whereas said horizontal component of the velocity of the object travelling through the granular medium on rotation of the one or more rotatable portions tends to decrease as the diameter of each said one or more rotatable portions increases beyond six times the (e.g. mean) diameter of the grains. The vertical component of the velocity of the object travelling through the granular medium on rotation of the one or more rotatable portions tends to increase as the diameter of each said one or more rotatable portions increases.

The object may be provided with two or more rotatable portions. The object may be provided with three or more rotatable portions. The object may be provided with four or more rotatable portions. Individual rotatable portions are typically independently rotatable about respective axes of rotation. The respective axes of rotation of the rotatable portions may lie in a single plane or extend in one or more (i.e. substantially) parallel planes.

Each rotatable portion may be provided at a (i.e. different) corner of the object. Each rotatable portion may be provided at a (i.e. different) face of the object. Each rotatable portion may be provided at a (i.e. different) end of the object.

The object may be a device. The object may be a motorised device. The device may be remote-controlled. The device may be autonomous.

The device may be a vehicle. The device may be a motorised vehicle. The vehicle may be remote-controlled.

The vehicle may be autonomous. The vehicle may be an unmanned vehicle such as an unmanned underground vehicle (e.g. a 'sand drone').

The device (e.g. the vehicle) may be provided with two or more propulsion means (e.g. propulsion units). The device (e.g. the vehicle) may be provided with three or more propulsion means (e.g. propulsion units). The device (e.g. the vehicle) may be provided with four or more propulsion means (e.g. propulsion units).

Each propulsion means (e.g. propulsion unit) may be provided at a (i.e. different) corner of the device (e.g. the vehicle). Each propulsion means (e.g. propulsion unit) may be provided at a (i.e. different) face of the device (e.g. the vehicle). Each propulsion means (e.g. propulsion unit) may be provided at a (i.e. different) end of the device (e.g. the vehicle).

The device (e.g. the vehicle) may comprise a processor (in electronic communication with a memory storing computer executable program code).

Rotation of a rotatable portion typically comprises one or more complete cycles of rotation of the said rotatable portion about its respective axis of rotation. Rotation of at least one of (e.g. each of) the one or more rotatable portions may comprise continuous rotation of said at least one of (e.g. each of) the one or more rotatable portions.

The device (e.g. the vehicle) may be configured (e.g. the processor may be programmed) to rotate at least one of (e.g. each of) the one or more rotatable portions at a (i.e. substantially) constant angular velocity. The method may comprise rotating the at least one of (e.g. each of) the one or more rotatable portions at a (i.e. substantially) constant angular velocity.

The device may comprise one or more sensors. The device may comprise one or more chemical sensors. The device may comprise one or more moisture and/or humidity sensors. The device may comprise one or more mycotoxin sensors. The device may comprise one or more mould (e.g. fungi) sensors. The device may comprise one or more mite sensors. The device may comprise one or more bacteria sensors. The device may comprise one or more (e.g. electromagnetic) radiation sensors. The device may comprise one or more heat sensors. The device may comprise one or more temperature sensors. The device may comprise one or more light sensors. The device may comprise one or more (e.g. video) cameras. The device may comprise one or more pressure sensors. The device may comprise one or more motion sensors. The device may comprise one or more gyroscopes. The device may comprise one or more accelerometers. The device may comprise one or more gravity sensors (e.g. one or more gravimeters). The device may be a sensing device.

The device (e.g. the processor) may be programmed to move the device through the granular medium by controlling the rotation of the one or more rotatable portions. The method typically comprises moving the device through the granular medium by controlling the rotation of the one or more rotatable portions.

The device (e.g. the processor) may be programmed to vary the direction of motion and/or the velocity of the device through the granular medium by adjusting the rotation of the one or more rotatable portions. The method may comprise varying the direction of motion and/or the velocity of the device through the granular medium by adjusting the rotation of the one or more rotatable portions.

The device (e.g. the processor) may be programmed to vary the direction of motion and/or the velocity of the device through the granular medium by adjusting the rotation of the one or more rotatable portions responsive to one or more outputs from the one or more sensors. The method may comprise varying the direction of motion and/or the velocity of the device through the granular medium by adjusting the rotation of the one or more rotatable portions responsive to one or more outputs from the one or more sensors.

The device (e.g. the vehicle) typically comprises a power source (e.g. a battery) and at least one motor for driving rotation of the at least one of (e.g. each of) the one or more rotatable portions.

Optional and preferred features of any one aspect of the invention may be features of any other aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 2:
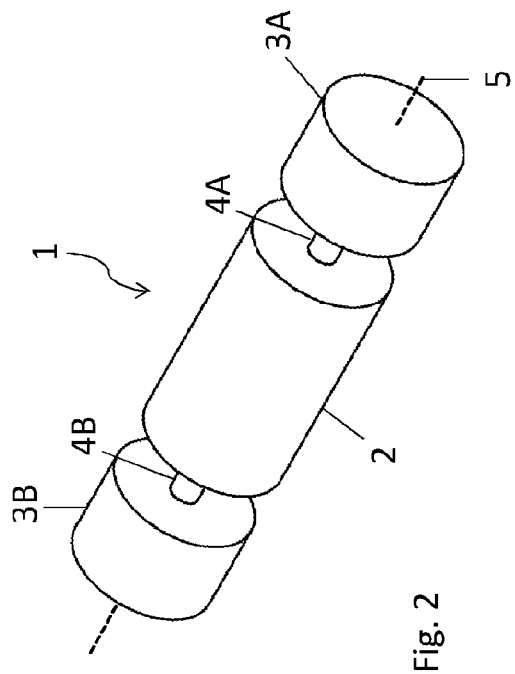
FIG. 2 shows the device of FIG. 1 in perspective.
Figure 1:
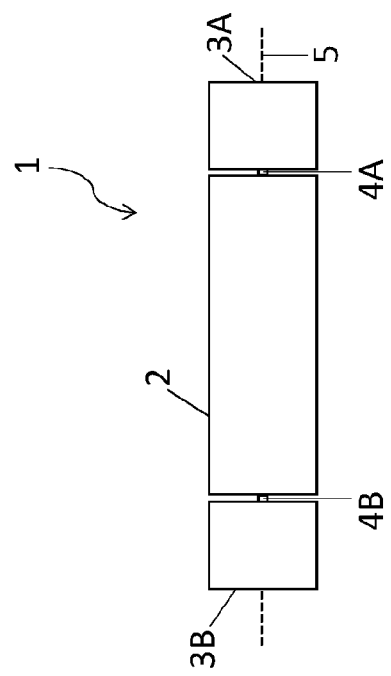
FIG. 1 shows a plan view of a device for propulsion through a granular medium.

FIGS. 1 and 2 show a device 1 for propulsion through a granular medium. The device includes a generally cylindrical device body 2 and first and second generally cylindrical rotatable portions 3A, 3B located at opposing ends of the device body. The rotatable portions are each mounted to the device body by way of respective axles 4A, 4B. The device body contains a motor (not shown) and a dedicated power source (not shown) for driving rotation of the rotatable portions, on the axles, about a longitudinal axis 5 of the device.

The inventor has found that, when the device 1 is submerged in a granular medium, rotating of the rotatable portions 3A, 3B about the longitudinal axis 5 causes propulsion (i.e. movement) of the device through the granular medium. The device can experience forces acting both vertically and horizontally and, depending on the configuration and operation of the device, vertical and/or horizontal movement of the device through the granular medium can be achieved.

Figure 3:
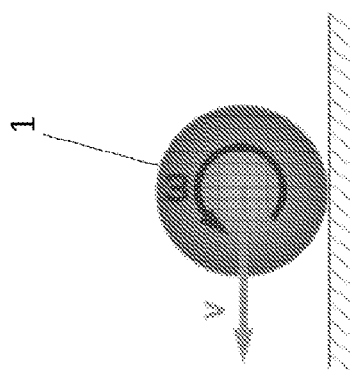
FIG. 3 compares schematically the direction of travel of an object having a circular cross-section rotating on a frictional surface (left) and rotating submerged in a granular medium (right)
Figure 3:
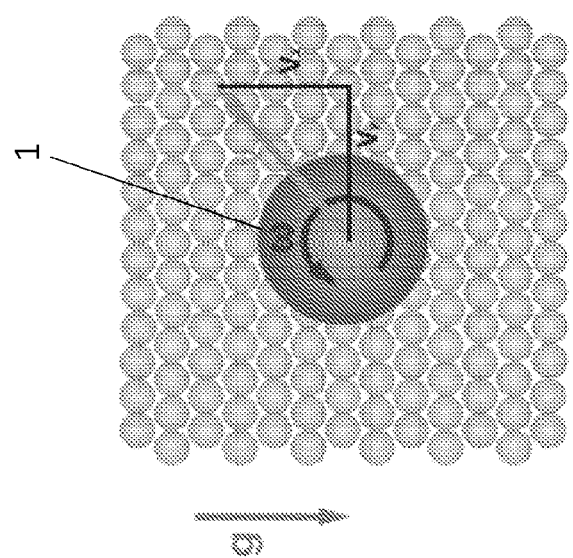

The direction of motion of the device in a granular medium is different from that which would be expected were the device placed on a horizontal frictional surface and the rotatable portions caused to rotate at the same speed. For example, FIG. 3 shows schematically that the horizontal component of the velocity of the device points in opposite directions when the device is operated on the horizontal frictional surface (left hand side) and in the granular medium (right hand side), wherein v is the device velocity, ω is the device angular velocity and g is the direction in which gravity acts. As shown in FIG. 3, rotation of the rotatable portions typically drives both vertical and horizontal motion of the device through the granular medium when the device is oriented such that the longitudinal axis 5 is substantially horizontal.

FIGS. 4 to 28 show the results of simulations of the effect of rotating a cylindrical (FIGS. 4 to 26) or spherical (FIGS. 27 and 28) body in a granular medium under different sets of conditions. In each case the simulation involved placing the cylindrical or spherical body (referred to as the 'intruder') in a box filled with approximately 150000 polydisperse grains having dimensionless diameters between 0.9 and 1.1 such that the average grain diameter, $\bar{d}$, was 1. Simulations were carried out using the Discrete Element Method (DEM) with grain-grain contact forces evaluated using a linear (Hookean) spring-dashpot model (although qualitatively similar results are achieved using a nonlinear (Hertzian) model). The cylindrical intruder had a length of $10\bar{d}$, a radius of $5\bar{d}$ and half spherical ends. The grain normal stiffness and normal damping coefficients were selected to produce a restitution coefficient of 0.7. The Coulomb criterion was used to allow for grain sliding with the grain friction coefficient taken to be 0.5. The tangential stiffness coefficient was set at $k_t=\frac{2}{7}k_n$ with no tangential damping. The simulation box had dimensions of $50\times50\times50$ $\bar{d}$ and was periodic in planar directions with a frictional wall at its base. Grains were poured into the box and allowed to settle into a state of rest before a vertical gravitational field, g, acting downwards, was applied and the intruder was rotated about its longitudinal axis with a constant angular velocity of $\omega=\sqrt{g/\bar{d}}$. The following simulation results are presented both in non-dimensional units and in SI units calculated for grains having properties similar to those of sand: $\bar{d}$ is taken to be 1 mm; the average particle mass is taken to be 1 mg; the normal stiffness coefficient is taken to be $2\times10^5$ kg/s$^2$; g is taken to be 10 m/s$^2$.

Figure 4:
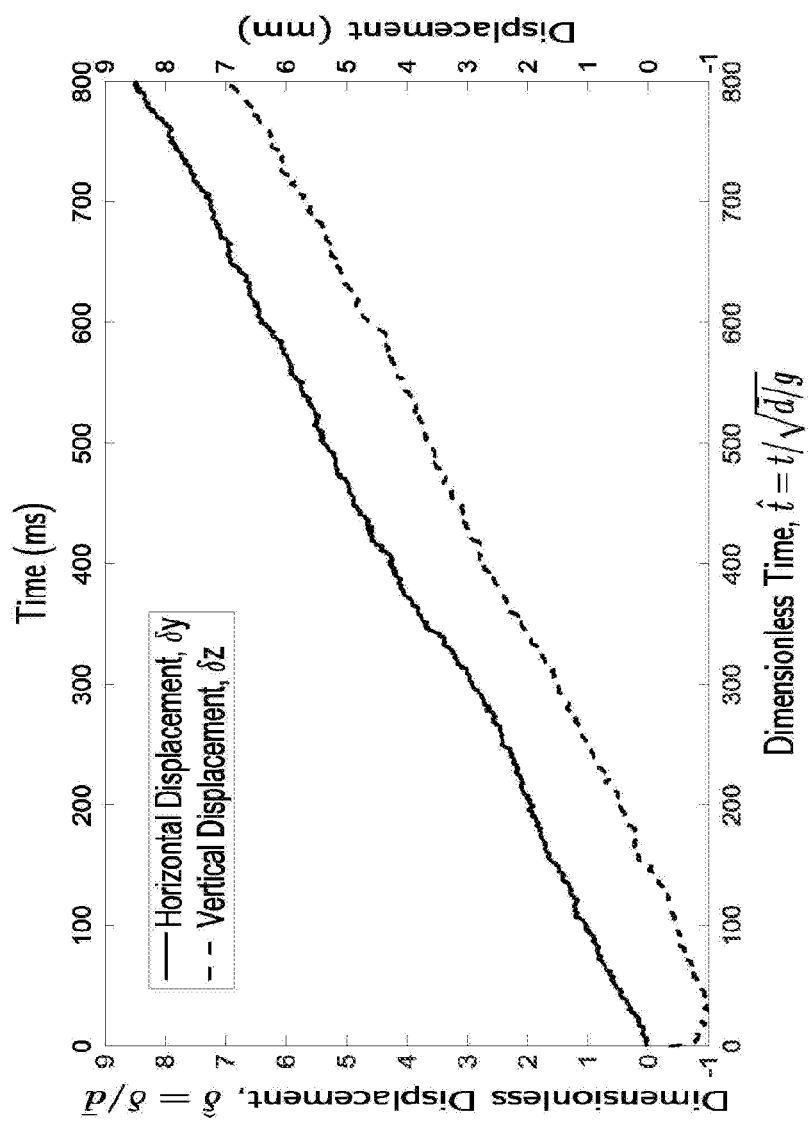
FIG. 4 shows the vertical and horizontal displacement of a rotating cylindrical intruder as a function of time when submerged in a granular medium.
Figure 5:
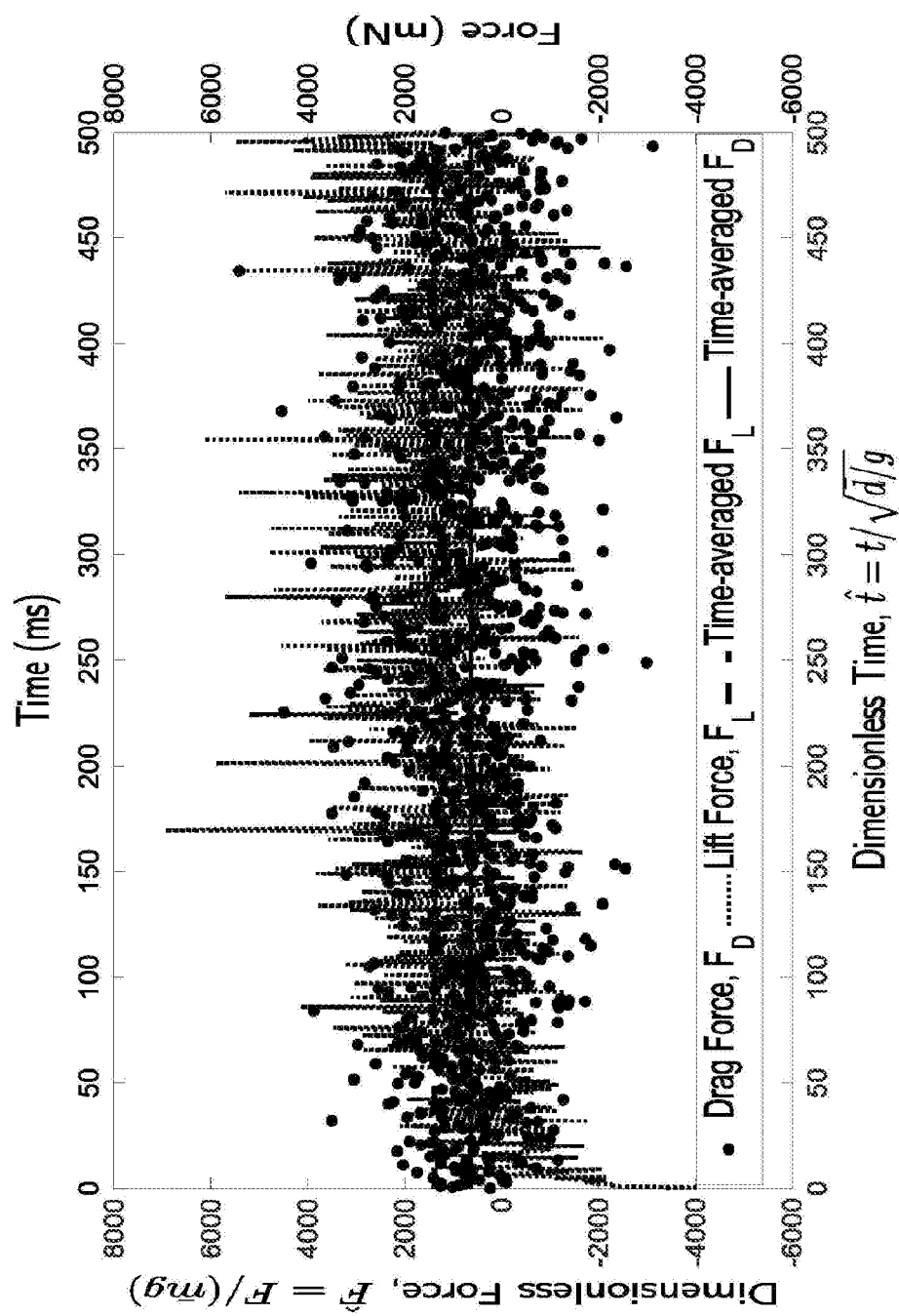
FIG. 5 shows the instantaneous lift and drag forces on a rotating cylindrical intruder as a function of time, as well as time-averaged lift and drag forces on the intruder, when submerged in a granular medium.

As can be seen in FIG. 4, the horizontal displacement of the intruder as it rotated at a constant angular velocity followed a linear profile (excluding fluctuations) and therefore the intruder traveled at a substantially constant velocity. The vertical component of the intruder's displacement dipped initially on commencing rotating as the intruder sank slightly in the box as adjacent grains were mobilised by frictional interactions, but subsequently accelerated to reach a terminal, linear profile. This behaviour is in line with the forces recorded on the intruder (FIG. 5) when its translational degrees of freedom were constrained. The horizontal force acting on the intruder was found to point away from the direction in which friction acts on its lower side. FIG. 5 also shows how the lift force on the intruder was initially negative, then rose through an exponential decay to reach a positive average value at which point the force plateaued (although with strong fluctuations). The average force on the intruder was positive, indicating that there was a positive upwards lift force on the device.

Figure 6:
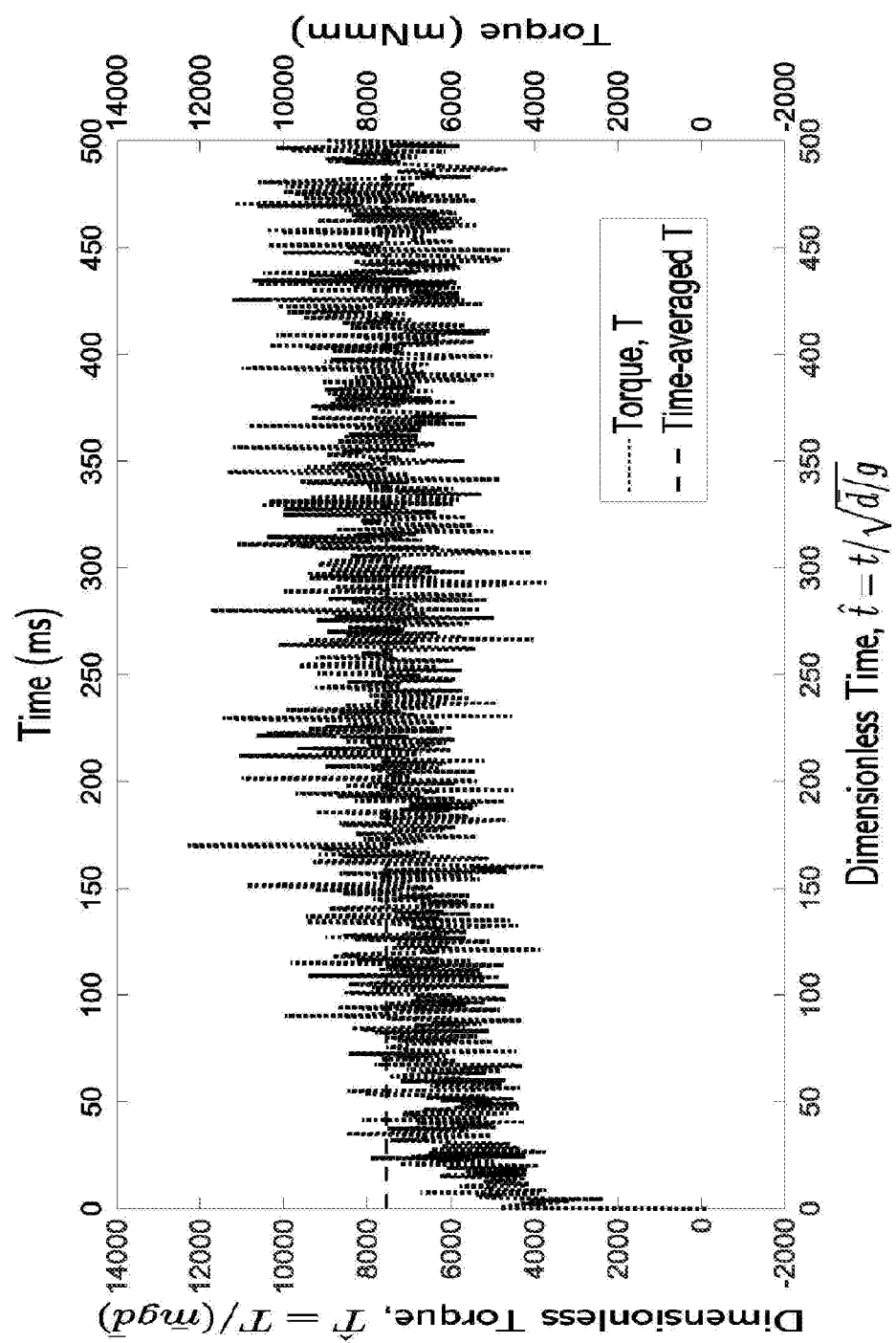
FIG. 6 shows the torque on a rotating cylindrical intruder as a function of time when submerged in a granular medium.

As can be seen in FIG. 6, the time-varying torque on the intruder also increased quickly in the first few simulation steps before reaching a constant average value.

Figure 7:
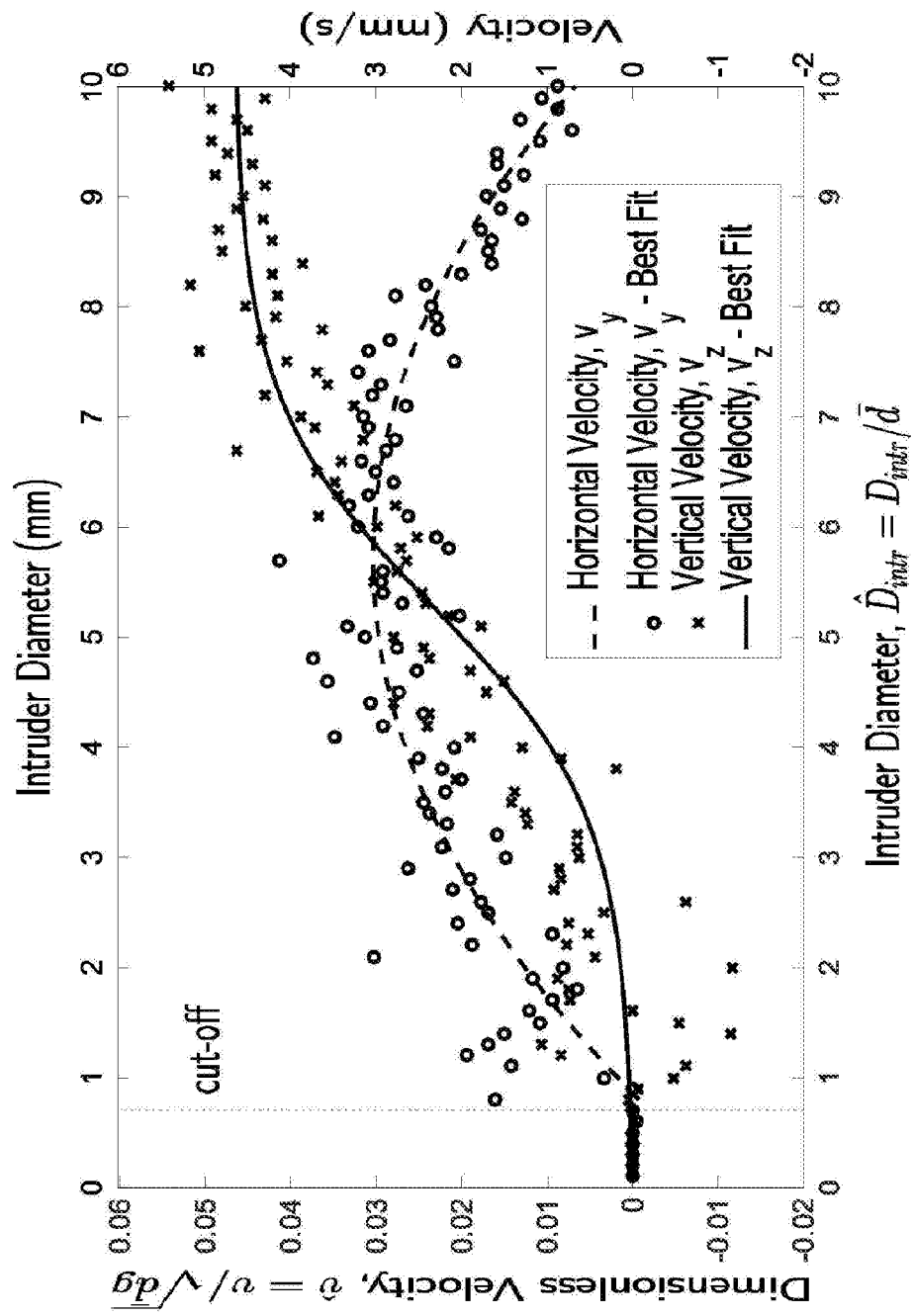
FIG. 7 shows the velocity of a rotating cylindrical intruder as a function of intruder diameter when submerged in a granular medium.
Figure 8:
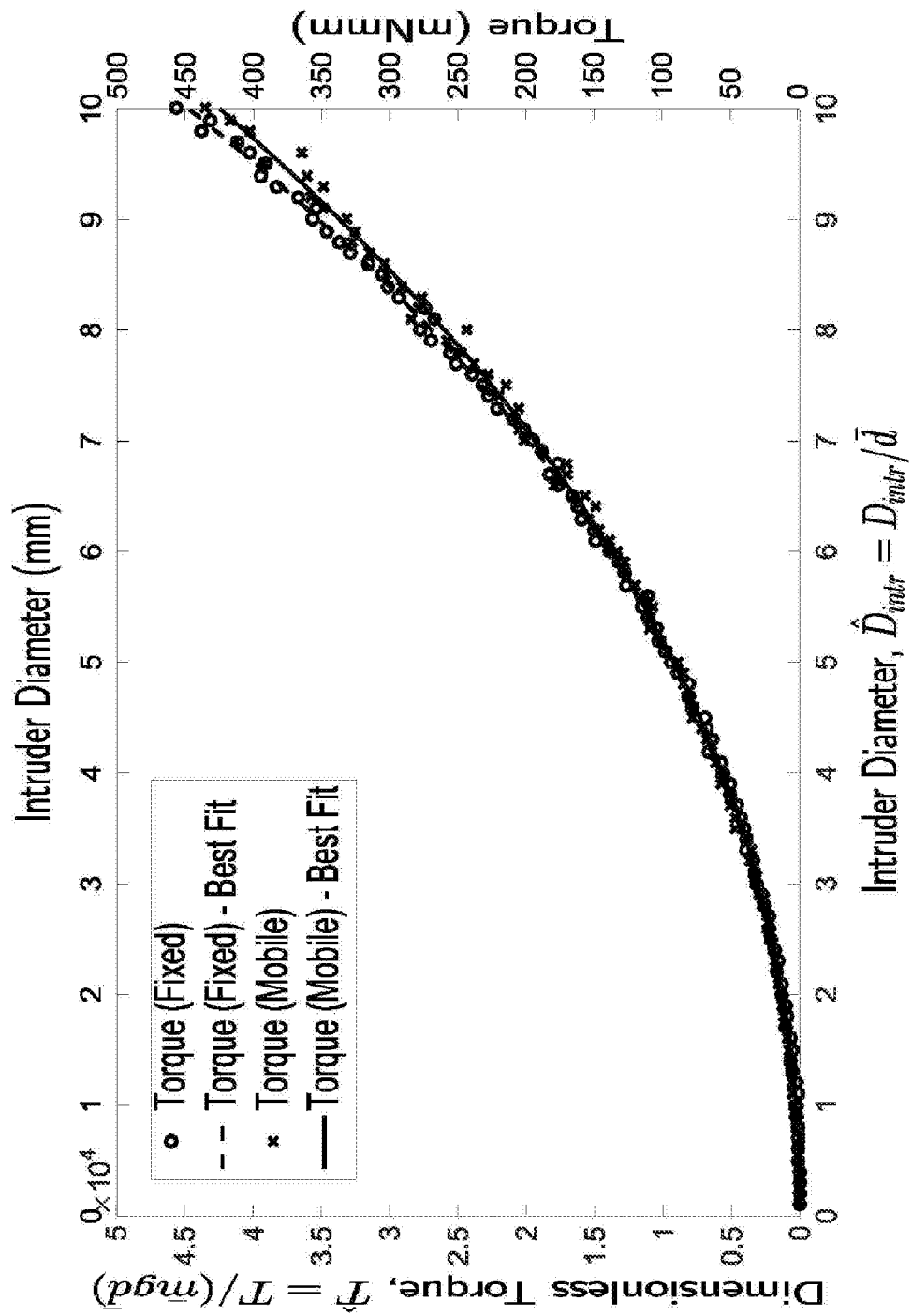
FIG. 8 shows the torque on a rotating cylindrical intruder as a function of intruder diameter when submerged in a granular medium.

As can be seen in FIGS. 7 and 8, as the intruder diameter was increased from $2\bar{d}$ to $10\bar{d}$, the vertical velocity of the intruder increased nearly linearly while the torque increased with a slow exponential profile. However, the horizontal velocity, which increases between intruder diameters of $2\bar{d}$ and $6\bar{d}$, actually decreased above $6\bar{d}$. These Figures also show that the direction of motion was downwards (i.e. negative) for intruder diameters equal to or below $2\bar{d}$.

Figure 9:
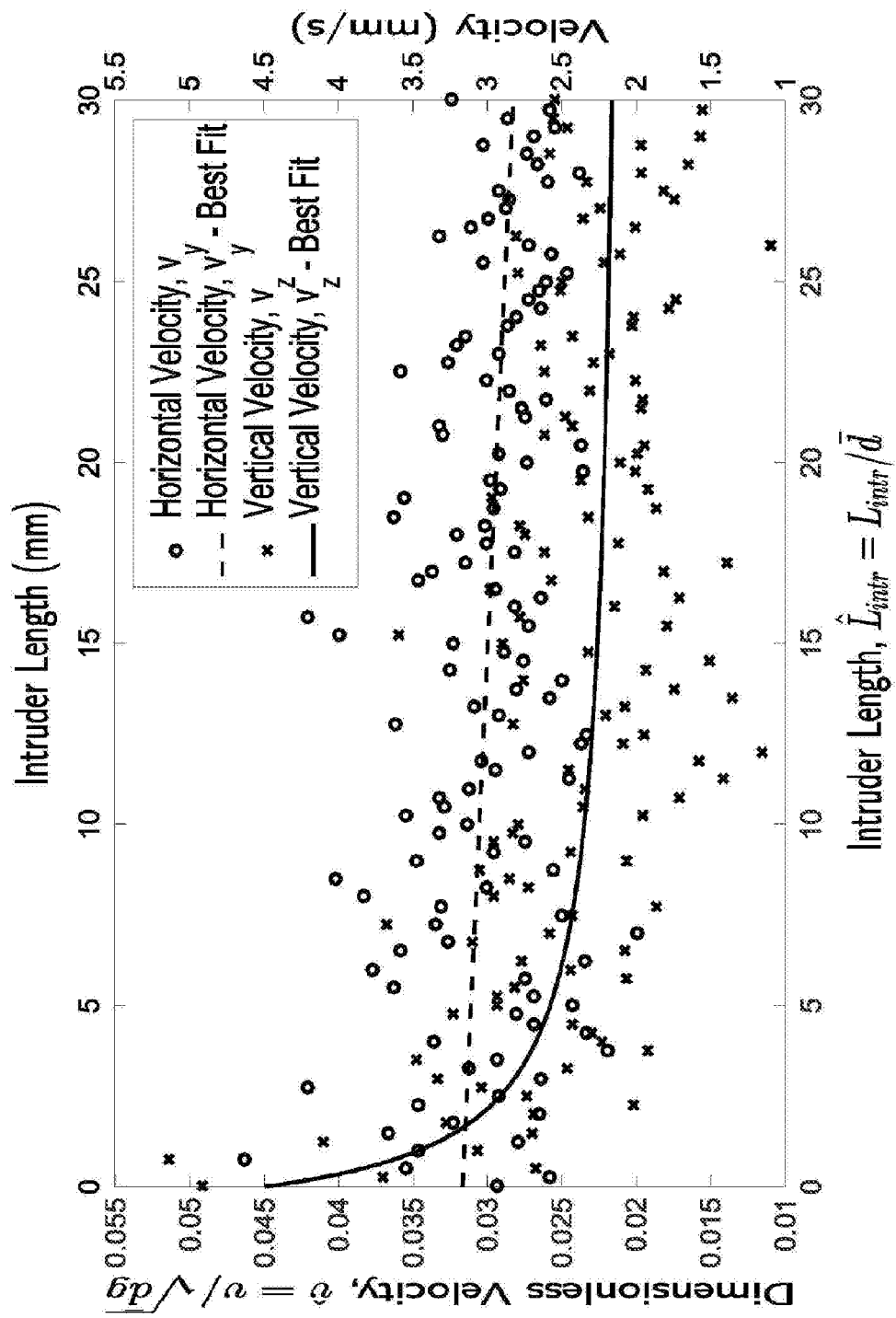
FIG. 9 shows the velocity of a rotating cylindrical intruder as a function of intruder length when submerged in a granular medium.
Figure 10:
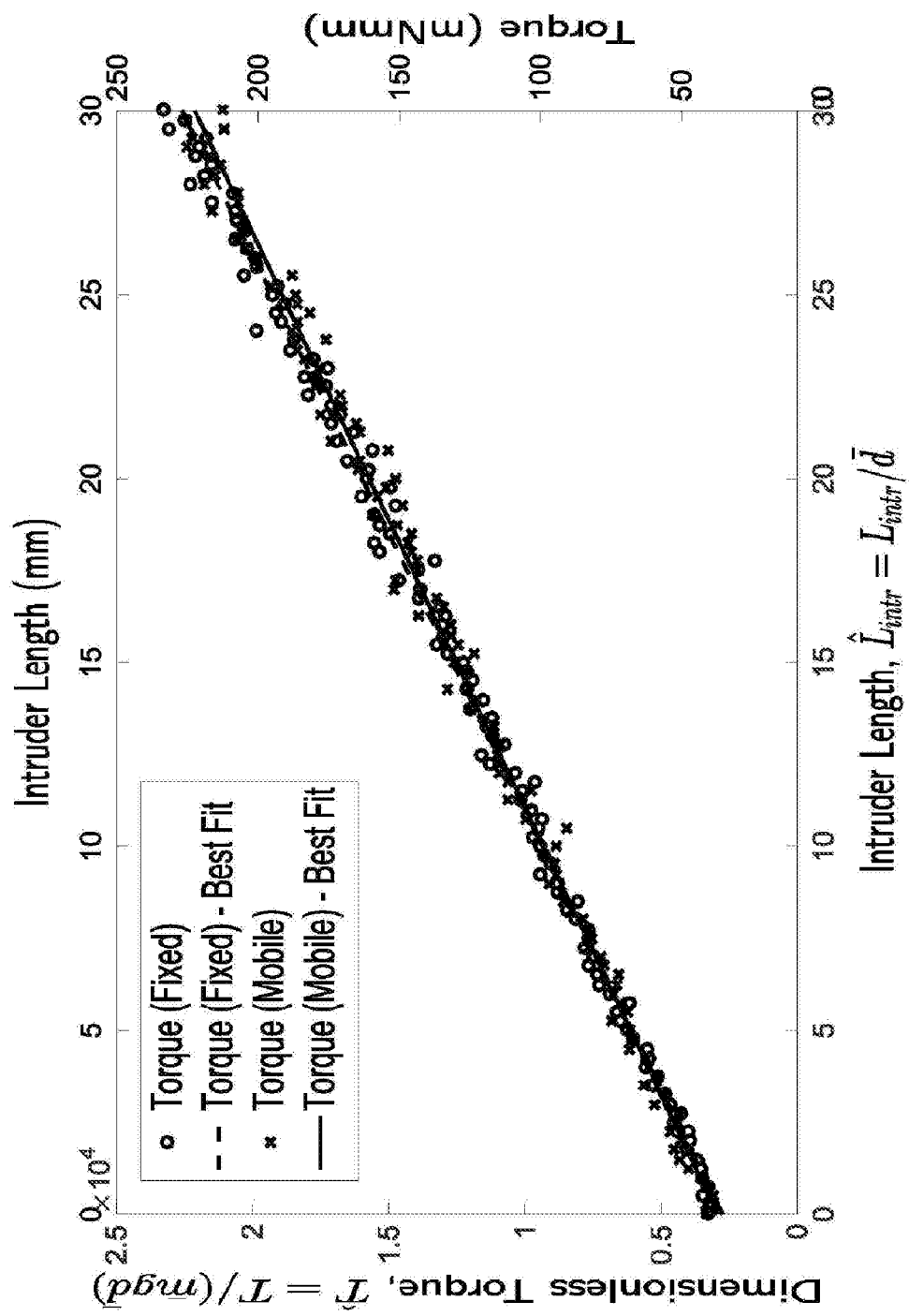
FIG. 10 shows the torque on a rotating cylindrical intruder as a function of intruder length when submerged in a granular medium.

As can be seen in FIGS. 9 and 10, the dimensionless length of the intruder (varied from 0 (indicating a spherical intruder) to 30) had no discernible effect on the velocity, although the torque on the intruder increased linearly with intruder length.

Figure 11:
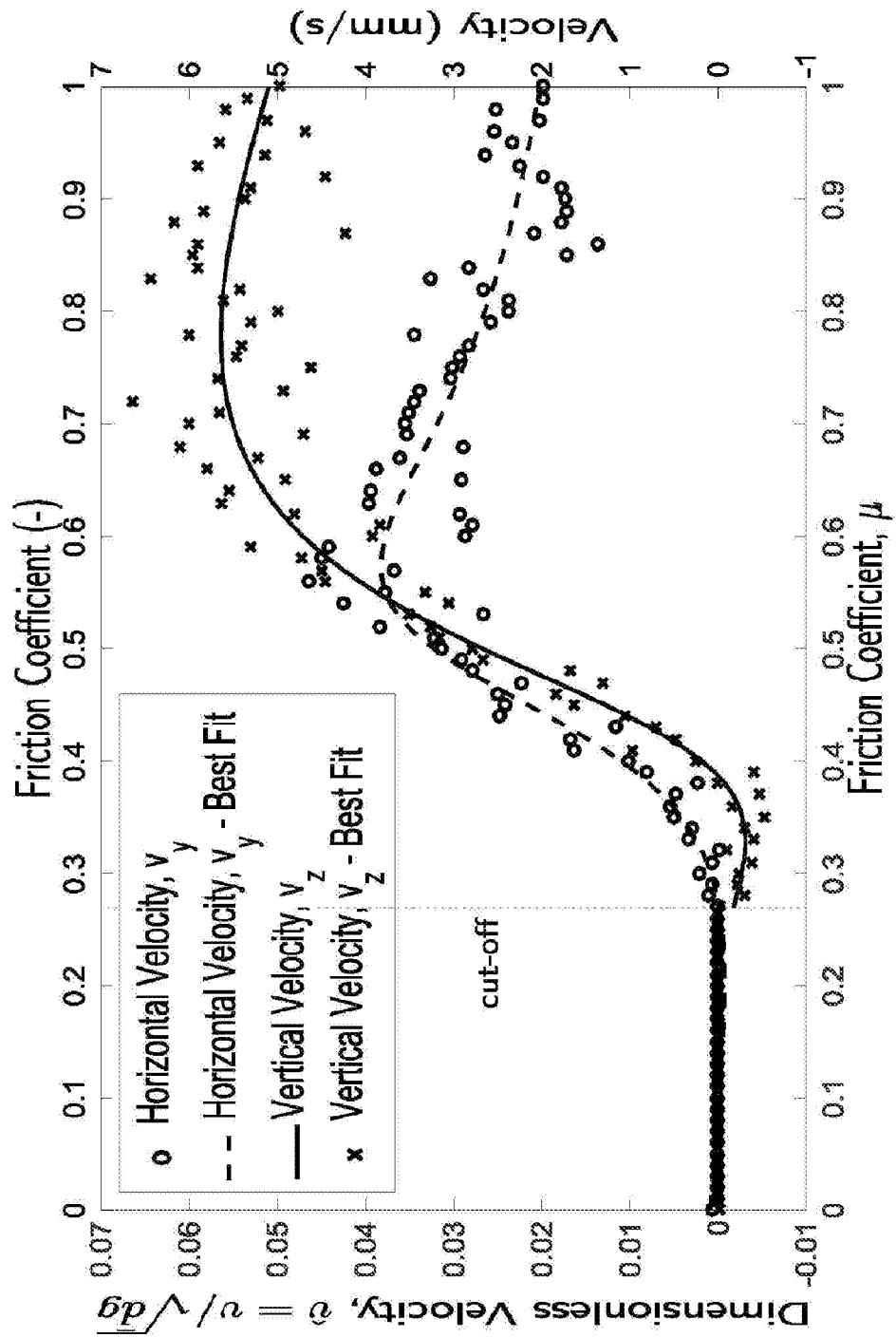
FIG. 11 shows the velocity of a rotating cylindrical intruder as a function of grain friction coefficient.
Figure 12:
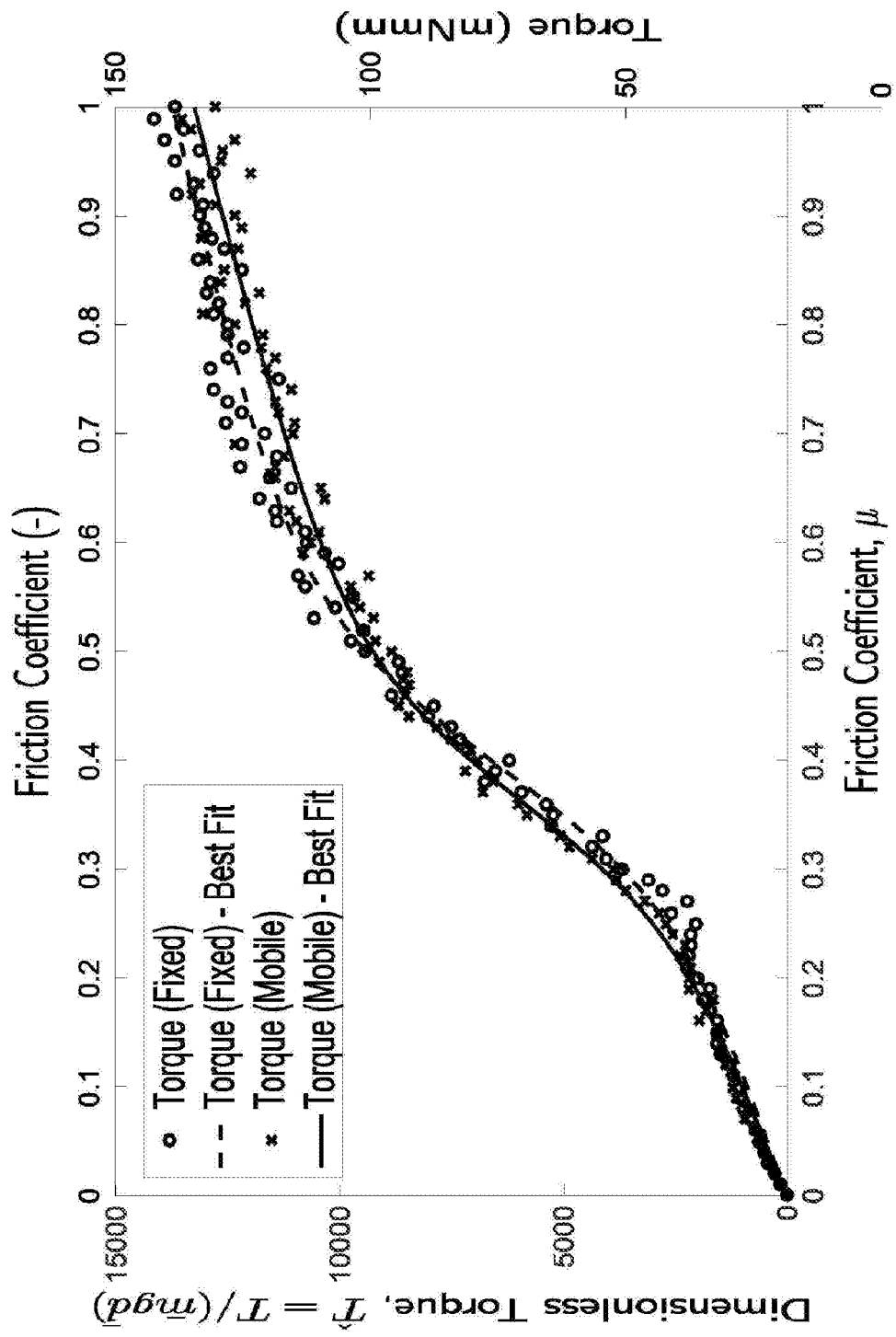
FIG. 12 shows the torque on a rotating cylindrical intruder as a function of grain friction coefficient.

As can be seen in FIGS. 11 and 12, both the velocity of and the torque on the intruder showed a sigmoidal behaviour as a function of the grain friction coefficient. For grain friction coefficients equal to or below 0.3, little or no motion of the device was generated and movement of the device only became significant when the grain friction coefficient exceeded 0.5. Friction is clearly important in the dynamics of the system. Most real-world granular materials have friction coefficients equal to or above 0.5.

Figure 13:
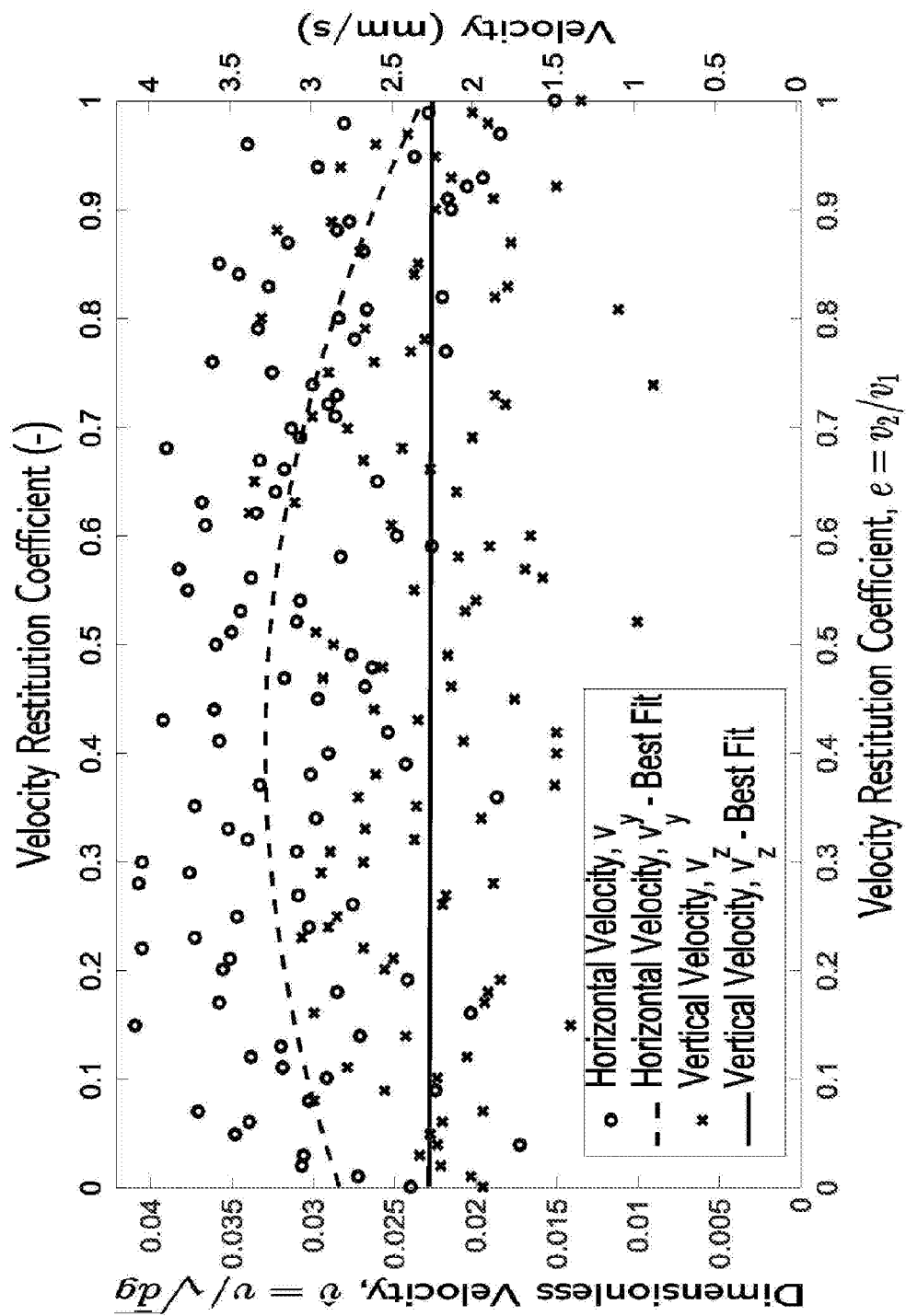
FIG. 13 shows the velocity of a rotating cylindrical intruder as a function of grain restitution coefficient.
Figure 14:
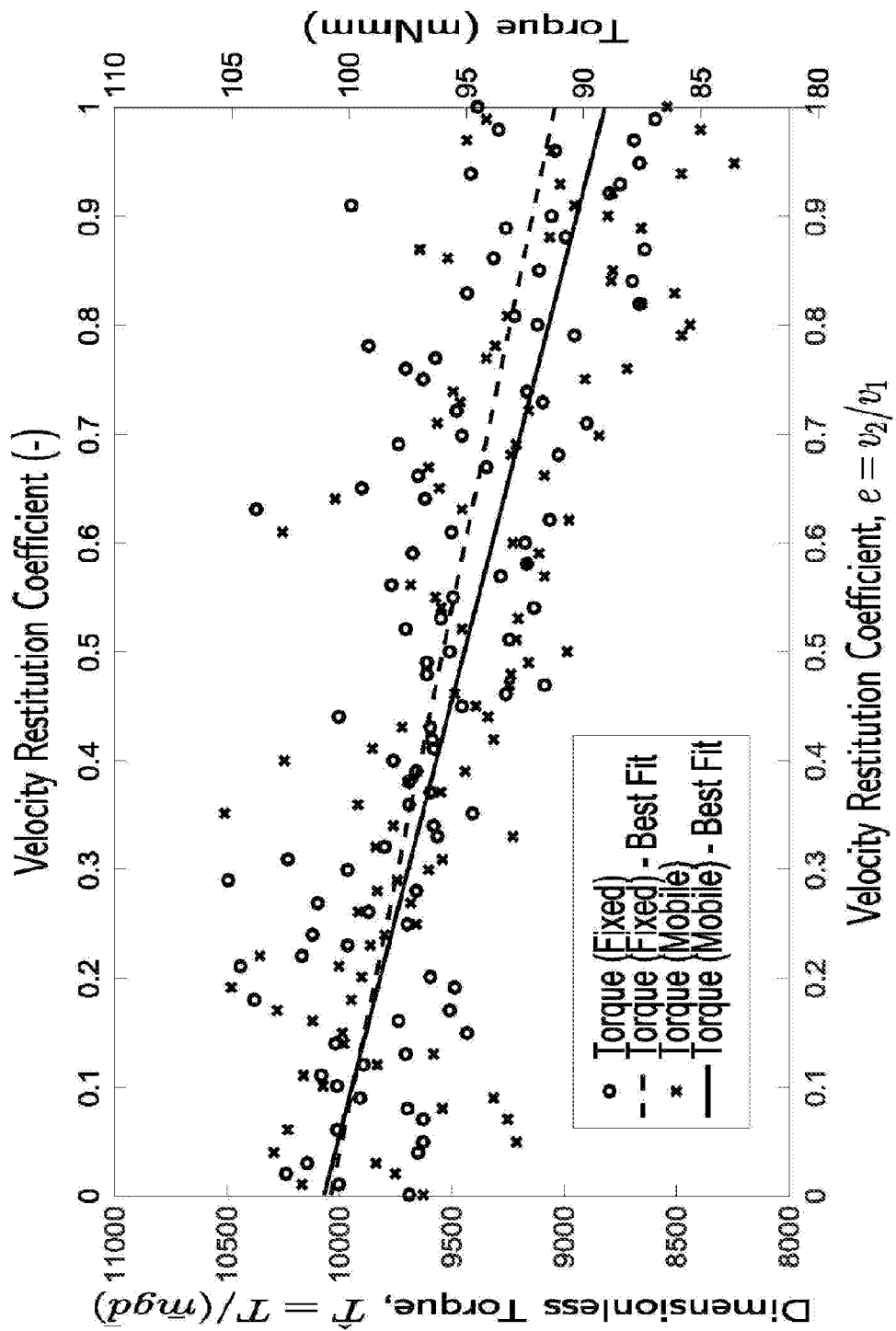
FIG. 14 shows the torque on a rotating cylindrical intruder as a function of grain restitution coefficient.

FIGS. 13 and 14 do not appear to show any clear relationship between the intruder velocity or torque and the grain restitution coefficient, implying that grain plasticity is not particularly important for the mechanism generating the force on the intruder.

Figure 15:
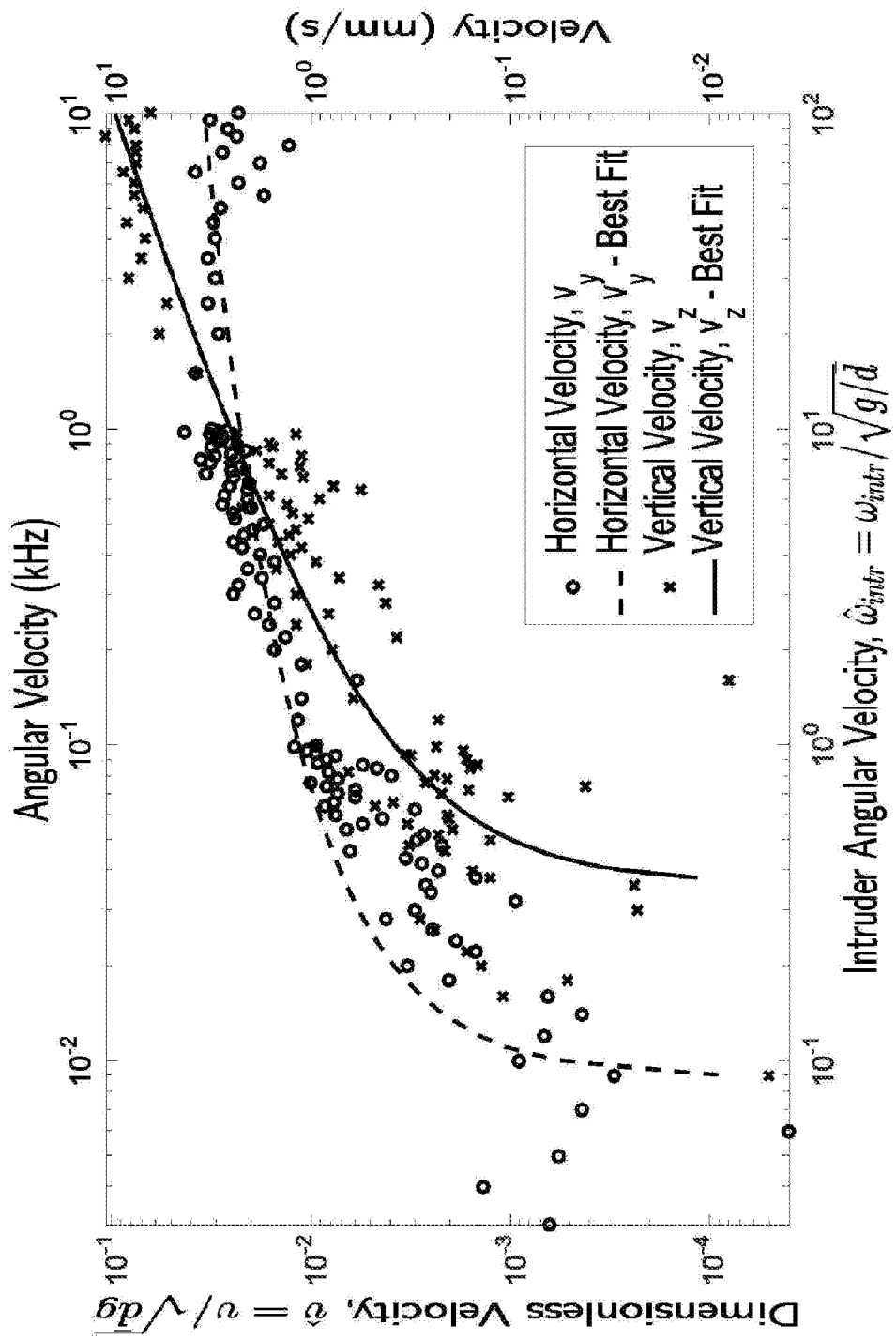
FIG. 15 shows the velocity of a rotating cylindrical intruder as a function of intruder angular velocity.
Figure 16:
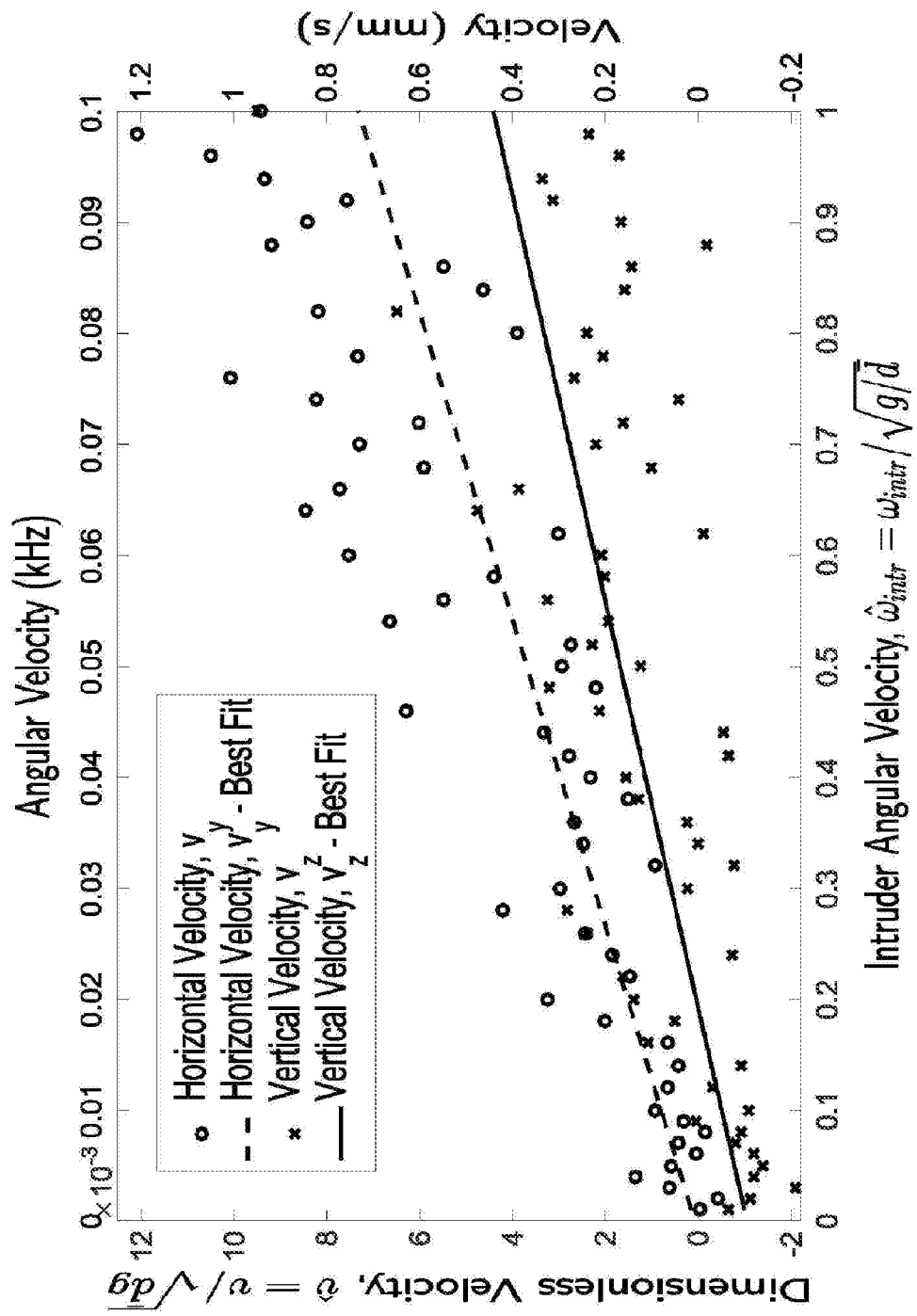
FIG. 16 reproduces FIG. 15 at low intruder angular velocities.
Figure 17:
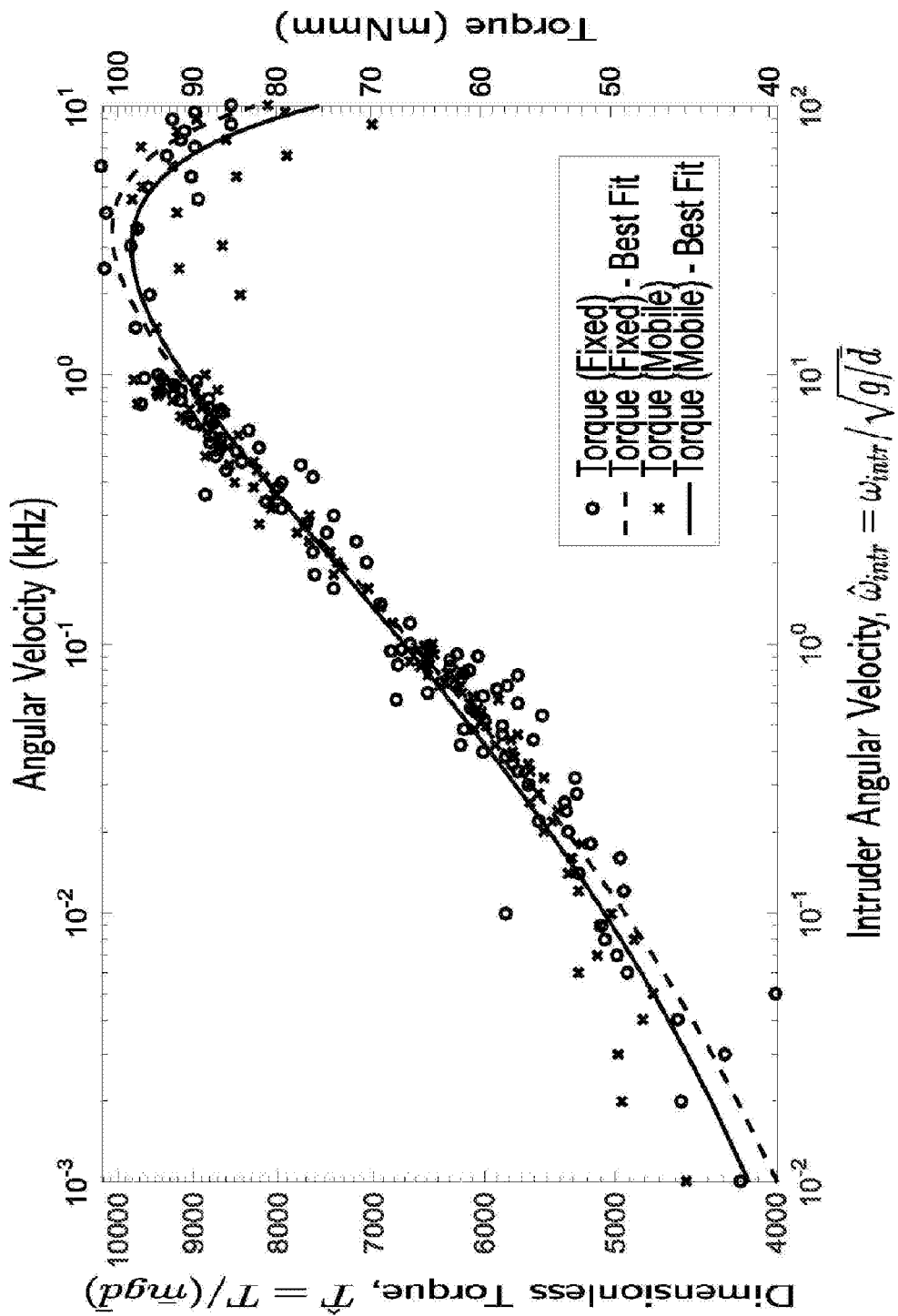
FIG. 17 shows the torque on a rotating cylindrical intruder as a function of intruder angular velocity.

However, FIGS. 15, 16 and 17 show that both the intruder velocity and the torque have a strong angular velocity dependency; both increased steeply for low intruder angular velocities until they reached an asymptotic value. This suggests that the intruder cannot be accelerated beyond this limit and also that, in practice, the device can be operated at relatively low driving velocities and motors with low RPMs, and consequently high torques could be used to achieve the full range of translational speeds available. These Figures also show that at high driving speeds the vertical velocity component was significantly larger than the horizontal velocity component. The region between these two regimes, in which the ratio between the vertical and horizontal velocity components changes as a function of driving velocity, could be used to control the device's direction of motion in practice.

In practice, movement of the device through the granular medium can be achieved with rotation of the rotatable portions through a wide range of angular velocities, for example between 0.1 Hz (i.e. 0.1 complete revolutions per second) and 10 kHz (i.e. 10000 complete revolutions per second), with the particular angular velocity selected based on device parameters such as device shape, size and weight as well as the nature of the granular material.

Figure 18:
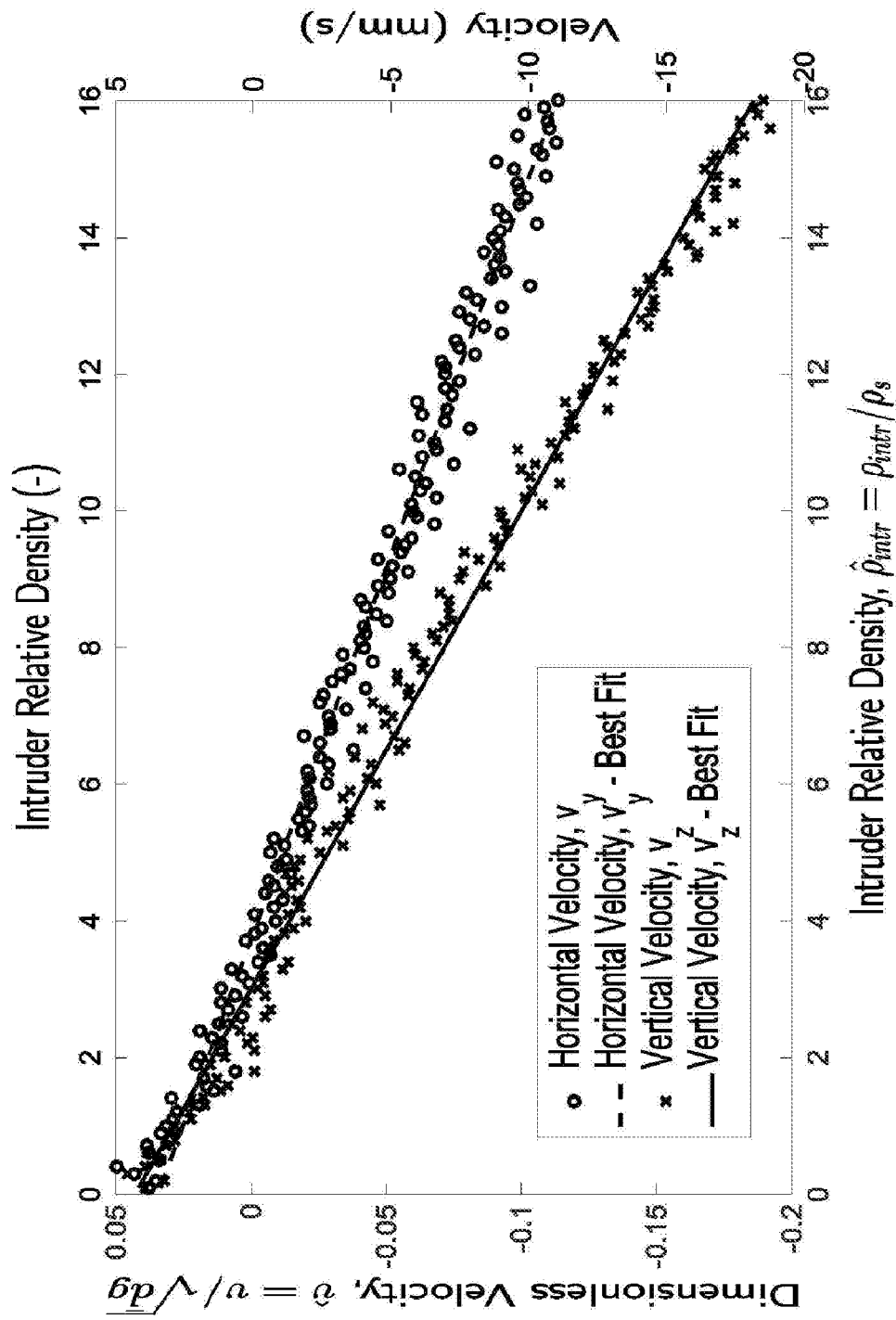
FIG. 18 shows the velocity of a rotating cylindrical intruder as a function of intruder relative density.
Figure 19:
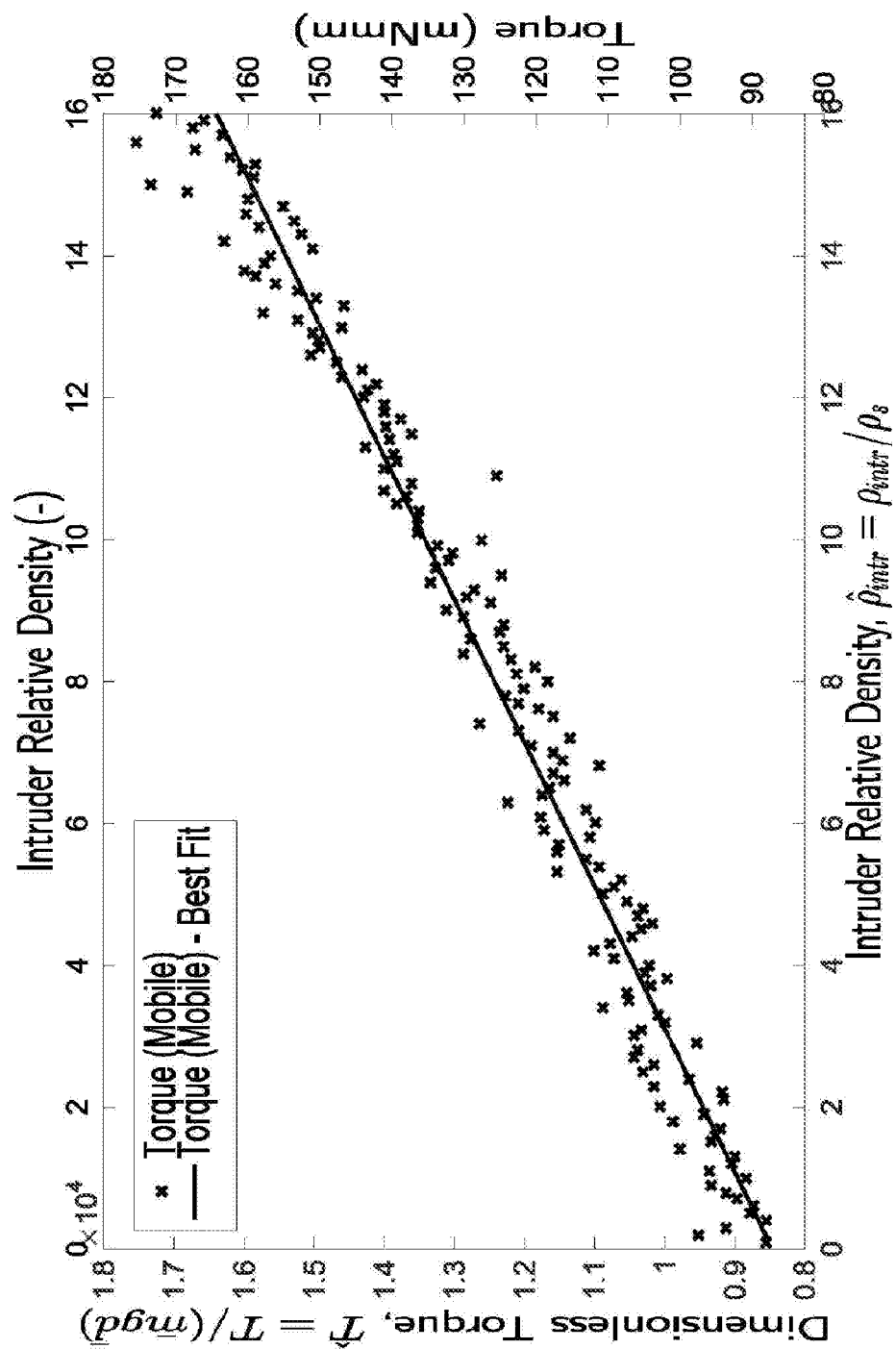
FIG. 19 shows the torque on a rotating cylindrical intruder as a function of intruder relative density.

FIGS. 18 and 19 show that, as the density of the intruder increased relative to the density of the grains, the translational velocity decreased and the torque increased. For high relative densities, both the horizontal and vertical velocity components reached negative values, although the relative densities required would be unrealistic for most real-world granular systems.

Figure 20:
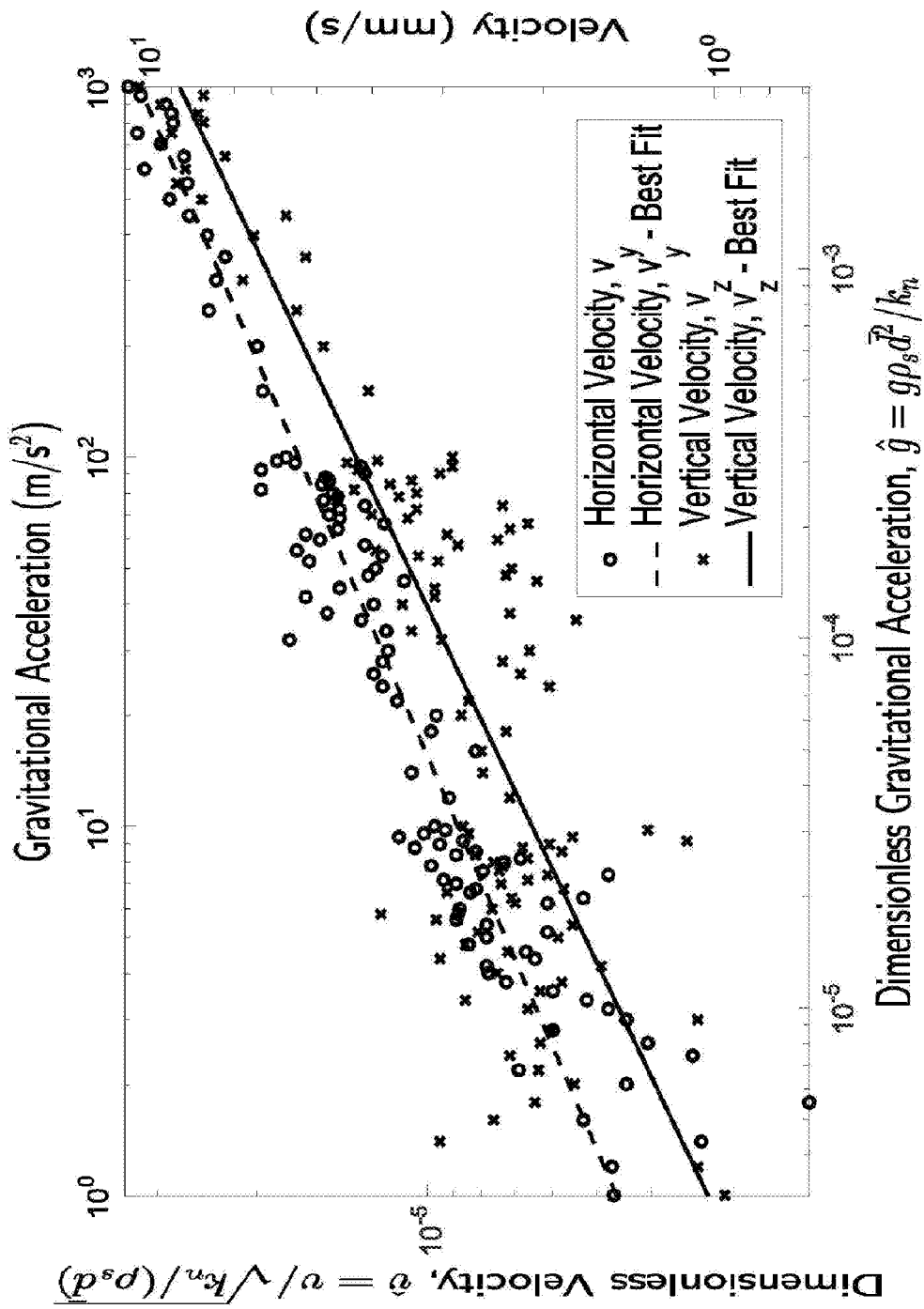
FIG. 20 shows the velocity of a rotating cylindrical intruder as a function of the applied gravitational force field.
Figure 21:
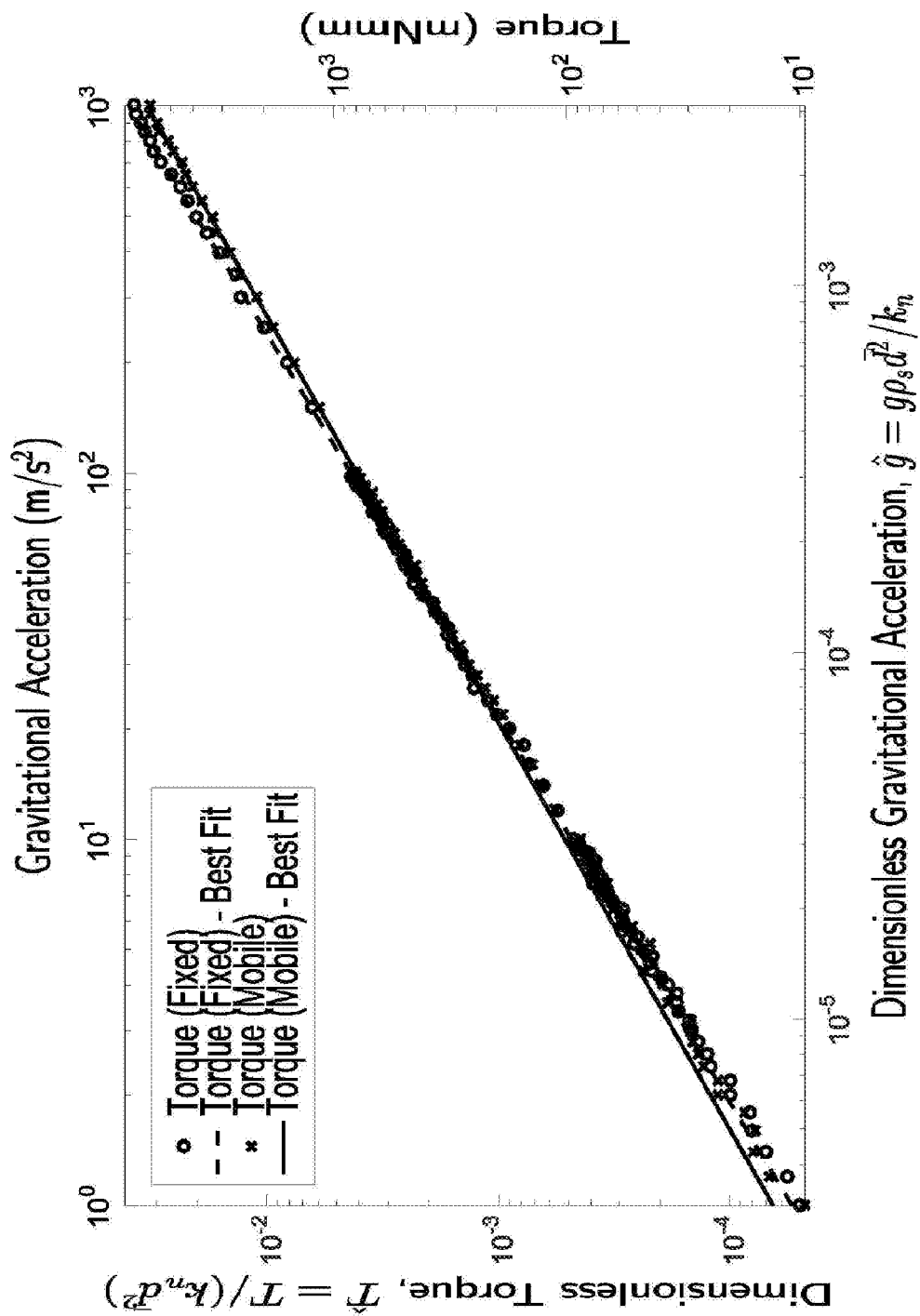
FIG. 21 shows the torque on a rotating cylindrical intruder as a function of the applied gravitational force field.

FIGS. 20 and 21 show the effect of varying the gravitational force field strength. As the field strength increased, both the horizontal and vertical velocity components, and the torque, increased linearly.

Figure 22:
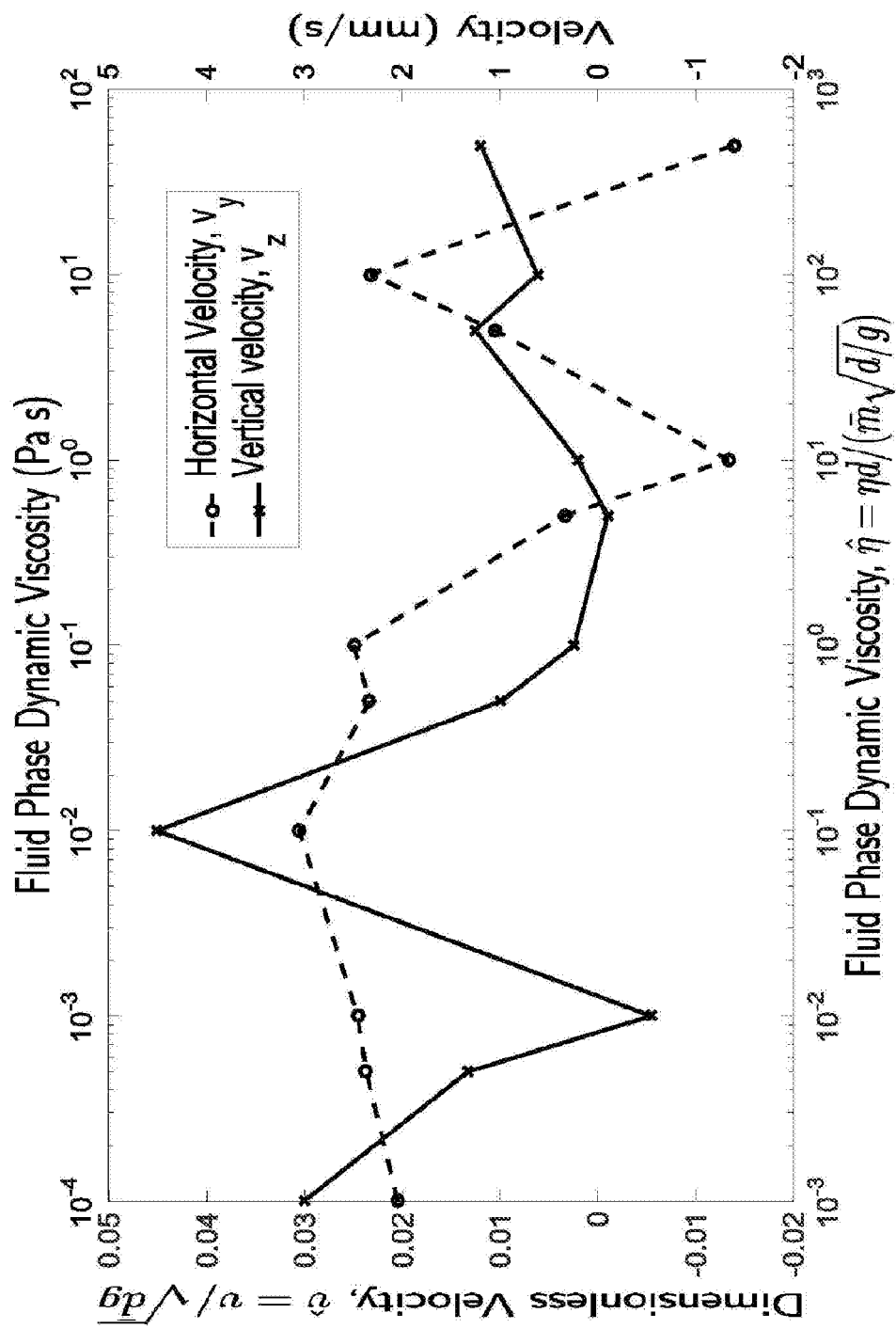
FIG. 22 shows the terminal horizontal and vertical velocity as a function of fluid phase dynamic viscosity for a rotating cylindrical intruder in a wet granular medium.

FIG. 22 shows the results of simulations designed to approximate a wet granular medium, compared to the previously dry granular systems in which grains are separated by empty or gaseous interstitial phases. The wet simulations were achieved using the 'lubricate/poly' lubrication pair-style available as part of the colloids package of the open-source molecular dynamics simulation package LAMMPS (Plimpton 2007). FIG. 22 shows the variation in horizontal and vertical velocity components for a cylindrical intruder as a function of the fluid phase dynamic viscosity. The Figure shows the presence of a terminal velocity with both vertical and horizontal components pointing in the same direction as for the dry granular medium at low viscosities, although as fluid forces became more significant at higher viscosities, this broke down. The results show at least qualitatively that the device should also work in most wet granular systems (considering that water has a dynamic viscosity of less than $10^{-3}$ Pa at room temperature).

Figure 23:
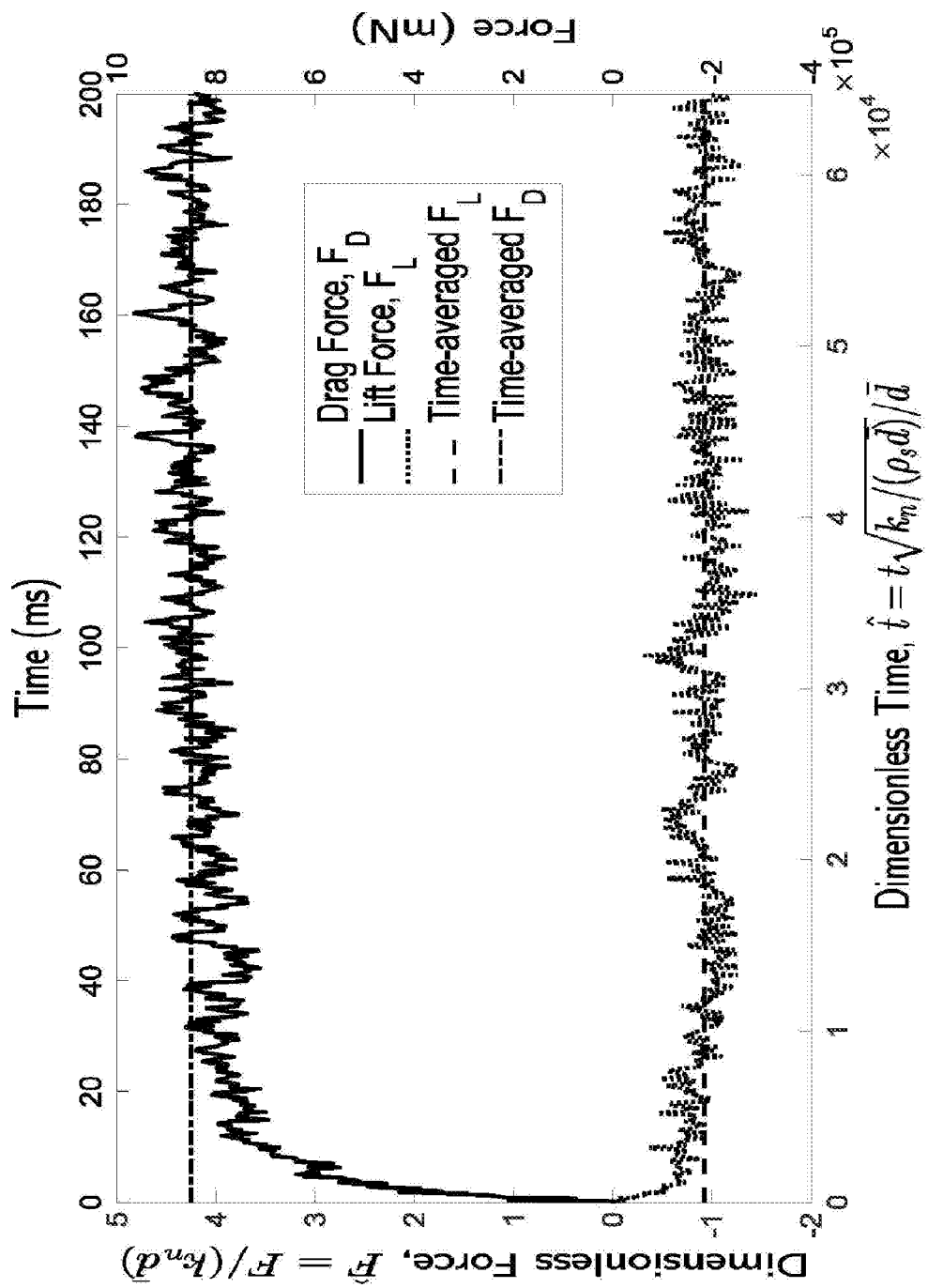
FIG. 23 shows the drag and lift forces on a rotating cylindrical intruder as a function of time when the intruder is subjected to a flow of granular material.

FIG. 23 shows the result of subjecting the rotating cylindrical intruder to a dense granular constant flow in a quasi-static regime (with a global volume packing fraction of 0.6). The purpose of this simulation was to test whether the phenomenon the inventor had discovered was related to the well-known 'Magnus effect' experienced when a fluid flows over a rotating body. The results show that the intruder experienced a drag force in the direction of granular flow, but the small lift force generated was exerted in a direction opposite to that which would have been expected from a Magnus effect, proving that the two phenomena are qualitatively different.

Figure 24:
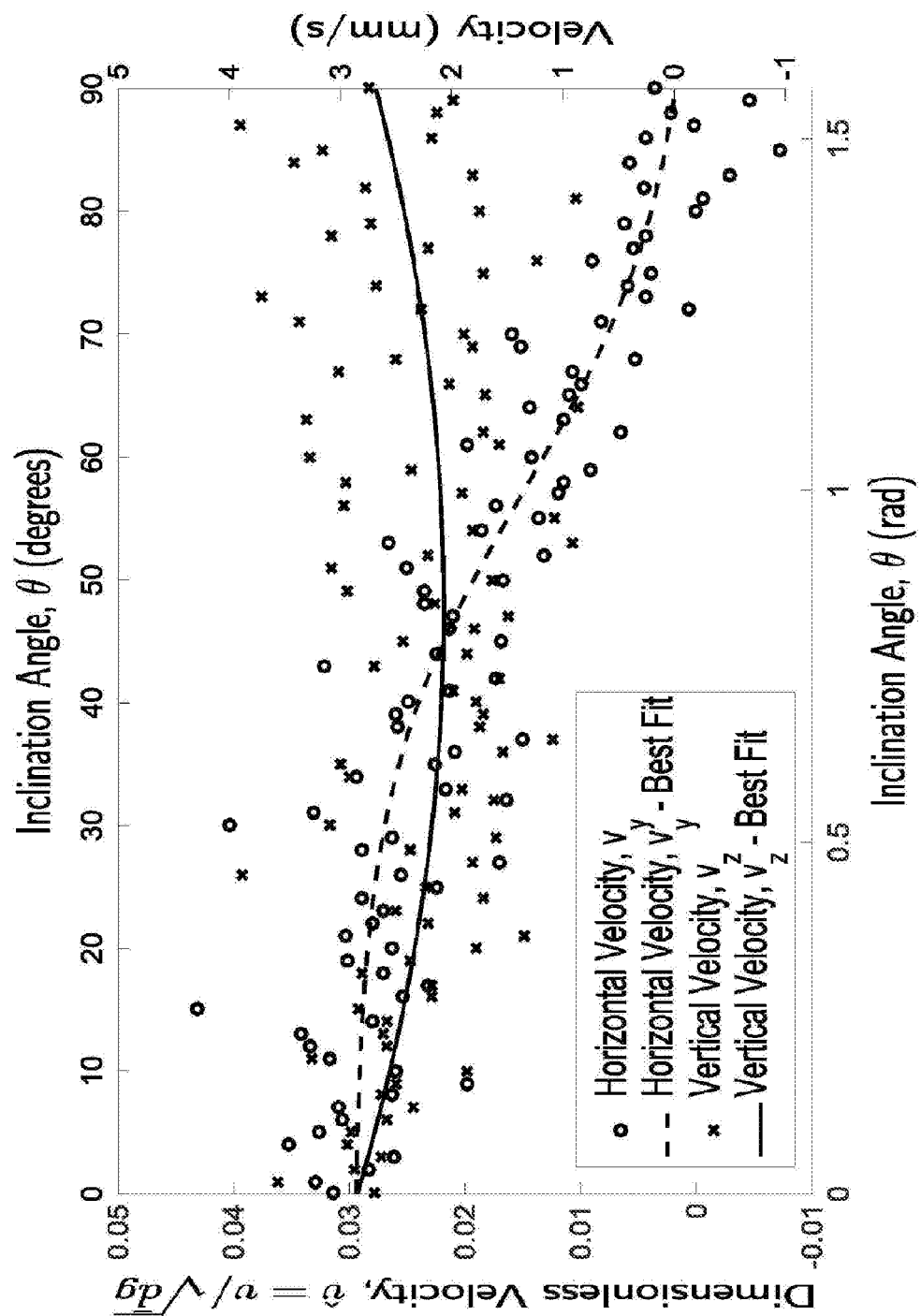
FIG. 24 shows the horizontal and vertical velocity of a rotating cylindrical intruder as a function of inclination angle relative to the horizontal.
Figure 25:
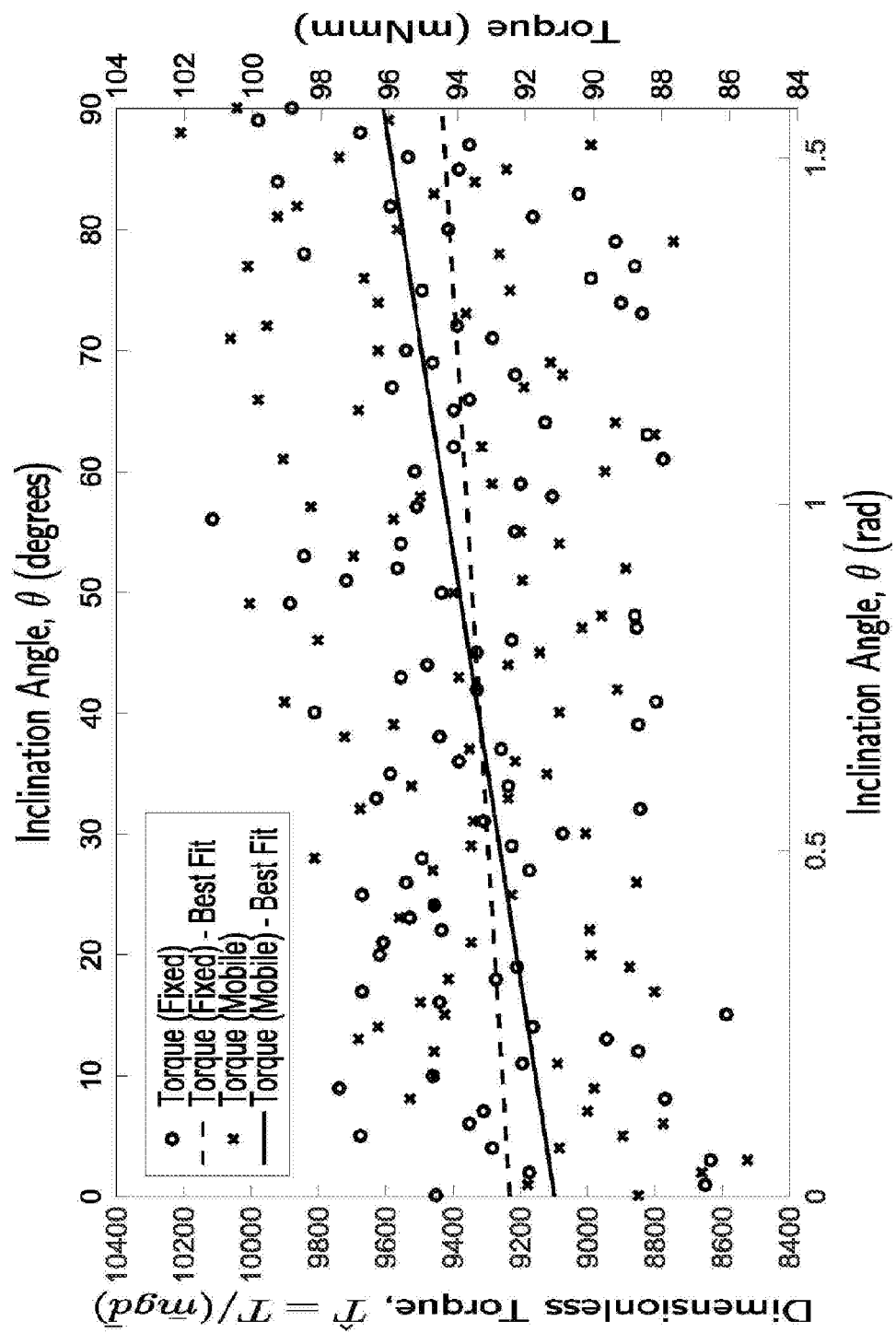
FIG. 25 shows the fixed and mobile torque on a rotating cylindrical intruder as a function of inclination angle relative to the horizontal.

FIGS. 24 and 25 show the effect of changing the orientation of the rotating cylindrical intruder relative to the horizontal. There was no significant change in the torque required to rotate the intruder, nor in the vertical component of the velocity, as the angle of inclination was varied. However, the horizontal component of the velocity appeared to decrease as the angle of inclination increased and approached a value of zero as the intruder's orientation (i.e. the longitudinal axis) approached the vertical.

Figure 26:
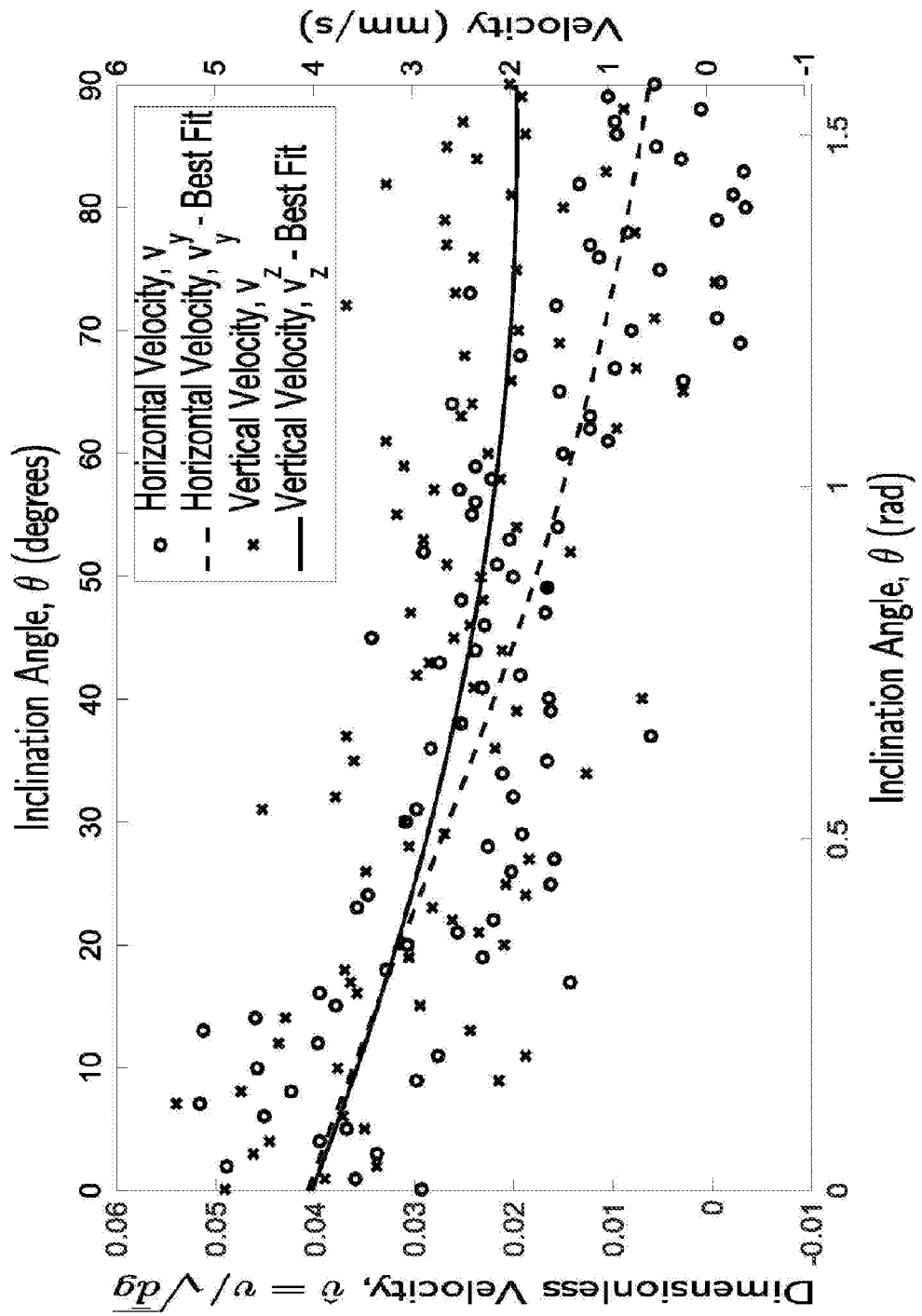
FIG. 26 shows the horizontal and vertical velocity of a rotating spherical intruder as a function of inclination angle relative to the horizontal.
Figure 27:
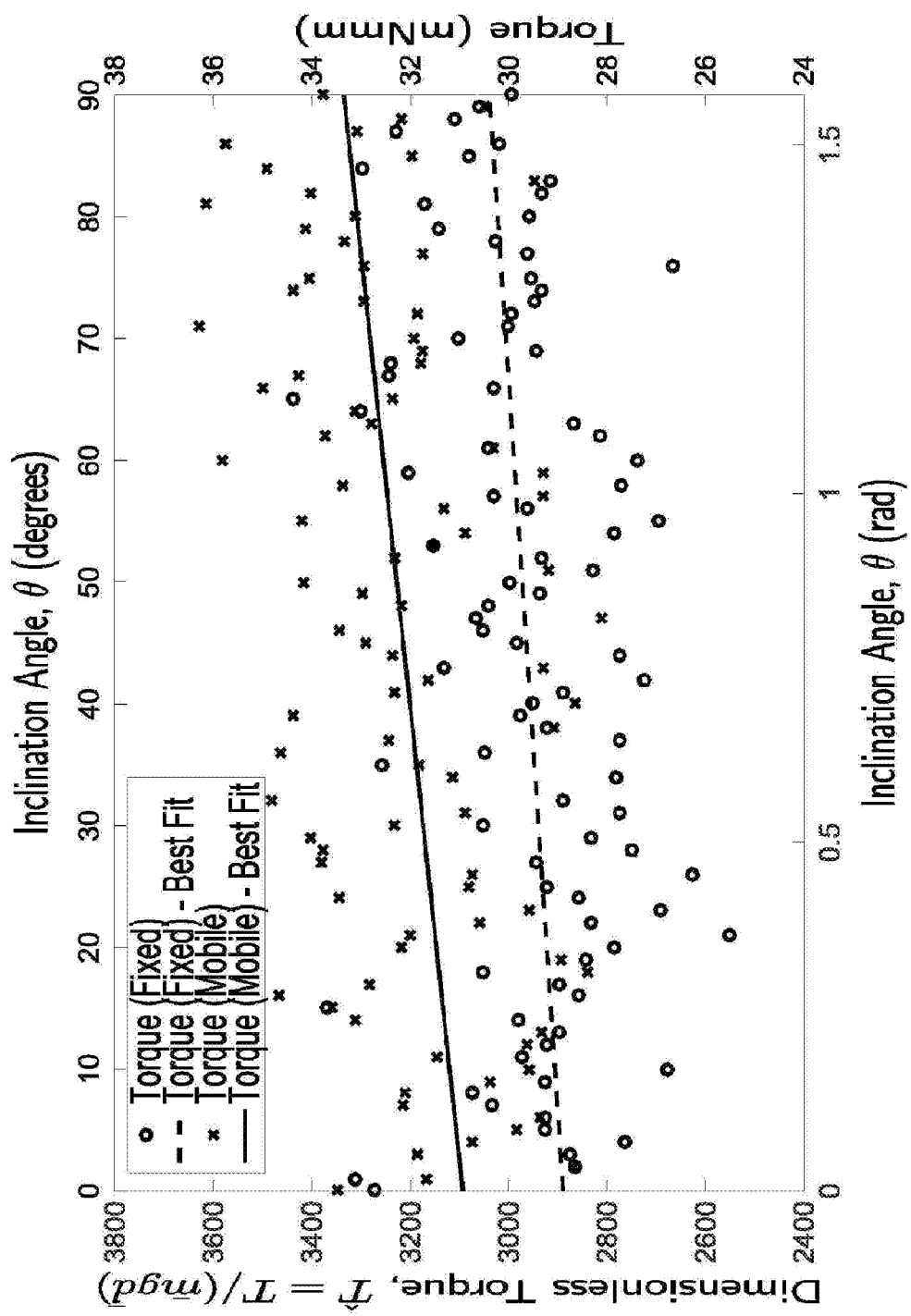
FIG. 27 shows the fixed and mobile torque on a rotating spherical intruder as a function of inclination angle relative to the horizontal.

Similarly, FIGS. 26 and 27 show the effect of changing the orientation of a rotating spherical intruder relative to the horizontal. Again the horizontal velocity component decreased towards zero as the axis of rotation approached the vertical. This time, however, also the vertical component of the intruder's velocity decreased linearly as a function of the angle of inclination, although at a slower rate than the horizontal component. The vertical component also did not tend towards zero at a vertical orientation but instead approached a value of about half that for a horizontal axis of rotation.

Further variations and modifications may be made within the scope of the invention herein disclosed.

Figure 28:
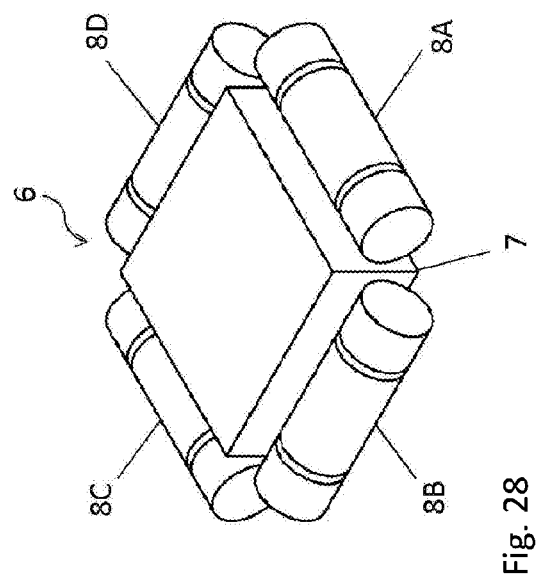
FIG. 28 shows a perspective view of an alternative device for propulsion through a granular medium.

For example, FIG. 28 shows a vehicle (a 'sand drone') 6 for transportation through a granular medium. The vehicle 6 includes a generally cuboidal vehicle body 7 having four propulsion units 8A, 8B, 8C, 8D attached to four different sides thereof. Each propulsion unit includes two rotatable portions similar to those of device 1. Rotation of the rotatable portions of each of the propulsion units, when the vehicle 6 is submerged in a granular medium, drives movement of the vehicle through the granular medium. The propulsion units each function in use as propellers for propelling the vehicle through the granular medium.

The vehicle may be provided with one or more sensors. The vehicle may be provided with a controller for controlling operation of the propulsion units. The vehicle may be provided with a processor (in electronic communication with a memory storing computer executable program code) programmed to control the motion of the vehicle through a granular medium, for example by directing the vehicle along a pre-programmed path. The vehicle may be remote-controlled (in which case the vehicle may include a receiver and a transmitter for communicating with a remote control unit) or the vehicle may be autonomous. Such a vehicle could be used in underground investigations, for object retrieval, in planetary exploration, or in (cereal, seed or pulse) grain or powder (e.g. cement) silos.

Figure 29:
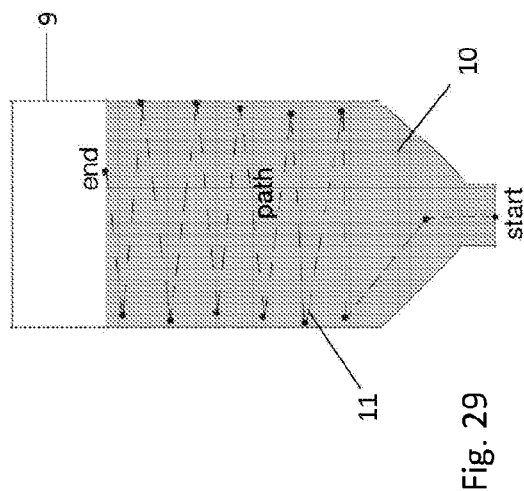
FIG. 29 shows schematically a path traveled by a device through a grain silo.

For example, FIG. 29 shows a silo 9 containing cereal grain 10. The vehicle 6 may be programmed to travel through the grain in the silo along a path 11 in order to mix the grains (ameliorating silo no-flow conditions such as arching, rat-holing or jamming) and reduce otherwise undetectable inhomogeneities and air pockets which could otherwise lead to dangerous grain entrapment and grain engulfment problems as well as sub-optimal flow conditions (e.g. arching or rat-holing). The vehicle can be provided with various sensors to detect moisture conditions, temperature, chemical levels, air voids and the presence of mould or bacteria for the purpose of monitoring grain condition.

Other applications of the device 1 or the vehicle 6 include: the retrieval of seabed or under-seabed objects such as oil pipes, electricity cable networks and seabed monitoring equipment buried by turbidity currents or sand avalanches; freeing vehicles, such as cars, whose wheels are trapped in sand; removal of pipes from the ground; and movable foundations for buildings.

The invention claimed is:

1. A method of propelling an object through a granular medium comprising granular material, the object being provided with one or more rotatable portions, the method comprising: providing the object submerged in the granular medium; and rotating at least one of the one or more rotatable portions about an axis of rotation to thereby move granular material adjacent the one or more rotatable portions and propel the object through the granular medium in a direction substantially perpendicular to the axis of rotation or in a direction inclined with respect to the axis of rotation.

2. The method according to claim 1, wherein the method is a method of propelling an object upwards through the granular medium against gravity, the method comprising rotating the at least one of the one or more rotatable portions about the axis of rotation to thereby move granular material downwards from above the one or more rotatable portions so that a force is exerted on the object which drives upwards motion of the object through the granular medium.

3. The method according to claim 1 comprising rotating at least one of the one or more rotatable portions about an axis of rotation inclined at an acute angle with respect to the horizontal which is less than 45°.

4. The method according to claim 1, wherein the one or more rotatable portions are circular in cross-section, optionally wherein an external shape of each rotatable portion is convex.

5. The method according to claim 1, wherein the one or more rotatable portions are elongate, optionally wherein the cross-sectional shape and/or area of each rotatable portion is constant along the length of the said rotatable portion, optionally wherein the one or more rotatably portions are cylindrical.

6. The method according to claim 5 comprising rotating at least one of the one or more rotatable portions about an axis of rotation coincident with a longitudinal axis of the said rotatable portion, optionally wherein the axis of rotation extends through the centre of mass of the said rotatable portion.

7. The method according to claim 1, wherein the one or more rotatable portions each have diameters at least two times greater than the mean diameter of grains forming the granular medium.

8. The method according to claim 1 comprising rotating at least one of the one or more rotatable portions at a constant angular velocity and optionally varying a direction of motion and/or a velocity of the vehicle through the granular medium by adjusting the rotation of the one or more rotatable portions responsive to one or more outputs from the one or more sensors.

9. The method according to claim 1, wherein the object is a vehicle for transportation through the granular medium, optionally wherein the vehicle comprises one or more sensors.

10. Propulsion means for propelling an object through a granular medium comprising granular material, the propulsion means being couplable or coupled to the object and comprising one or more rotatable portions rotatable about an axis of rotation, the one or more rotatable portions being configured such that, when the propulsion means is coupled to the object and the object and propulsion means are submerged in the granular medium, rotation of at least one of the one or more rotatable portions about the axis of rotation moves granular material adjacent the one or more rotatable portions and propels the object through the granular medium in a direction substantially perpendicular to the axis of rotation or in a direction inclined with respect to the axis of rotation.

11. The propulsion means according to claim 10, wherein the propulsion means is a propulsion means for propelling an object upwards through the granular medium and the one or more rotatable portions are configured such that, when the propulsion means is coupled to the object and the object and propulsion means are submerged in the granular medium, rotation of at least one of the one or more rotatable portions about the axis of rotation causes downwards movement of granular material from above the one or more rotatable portions so that a force is exerted on the object which drives upwards motion of the object through the granular medium.

12. The propulsion means according to claim 10, wherein the one or more rotatable portions are circular in cross-section, optionally wherein an external shape of each rotatable portion is convex.

13. The propulsion means according to claim 10, wherein the one or more rotatable portions are elongate, optionally wherein the cross-sectional shape and/or area of each rotatable portion is constant along the length of the said rotatable portion, optionally wherein the one or more rotatable portions are cylindrical.

14. The propulsion means according to claim 10, wherein each of the one or more rotatable portions is rotatable about a respective axis of rotation which is coincident with a longitudinal axis of the said rotatable portion, optionally wherein the axis of rotation of each of the one or more rotatable portions extends through the respective centre of mass of each said rotatable portion.

15. The propulsion means according to claim 10, wherein each of the one or more rotatable portions has a diameter at least two times greater than the mean diameter of grains forming the granular medium.

16. A vehicle for transportation through a granular medium comprising granular material, the vehicle comprising at least one propulsion means according to claim 10.

17. The vehicle according to claim 16, wherein the vehicle is configured to rotate at least one of the one or more rotatable portions at a constant angular velocity.

18. The vehicle according to claim 16 comprising one or more sensors, optionally wherein the one or more sensors comprises sensors suitable for detecting moisture conditions, temperature, chemical levels, air voids and the presence of mould or bacteria.

19. The vehicle according to claim 16, wherein the vehicle is configured to vary a direction of motion and/or a velocity of the device through the granular medium by adjusting the rotation of the one or more rotatable portions responsive to one or more outputs from the one or more sensors.

20. The vehicle according to claim 19 wherein the granular medium is cereal seed or pulse grains.

* * * * *